(12) United States Patent
Ide

(10) Patent No.: US 7,251,410 B2
(45) Date of Patent: Jul. 31, 2007

(54) VARIABLE OPTICAL ATTENUATOR AND OPTICAL FILTER

(75) Inventor: Masafumi Ide, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 51 days.

(21) Appl. No.: 11/104,633

(22) Filed: Apr. 13, 2005

(65) Prior Publication Data
US 2005/0232570 A1 Oct. 20, 2005

(30) Foreign Application Priority Data

| Apr. 19, 2004 | (JP) | ............................. 2004-122646 |
| Jul. 20, 2004 | (JP) | ............................. 2004-211002 |
| Mar. 11, 2005 | (JP) | ............................. 2005-070169 |

(51) Int. Cl.
*G02B 6/00* (2006.01)
(52) U.S. Cl. ........................................ 385/140; 385/11
(58) Field of Classification Search .............. 385/140, 385/11, 31, 33, 34; 398/152, 184
See application file for complete search history.

(56) References Cited

U.S. PATENT DOCUMENTS

| 5,727,109 | A | * | 3/1998 | Pan et al. ................... 385/140 |
| 6,195,479 | B1 | * | 2/2001 | Pan ............................. 385/18 |
| 6,560,396 | B1 | * | 5/2003 | Yan et al. .................. 385/140 |
| 6,826,318 | B2 | * | 11/2004 | Nagaeda et al. ............. 385/11 |
| 7,034,979 | B1 | * | 4/2006 | Feng et al. ................. 359/246 |
| 7,079,320 | B2 | * | 7/2006 | Kewitsch .................... 359/618 |
| 2004/0120683 | A1 | * | 6/2004 | Cohen ........................ 385/140 |

FOREIGN PATENT DOCUMENTS

JP   2001-13477 A   1/2001

\* cited by examiner

*Primary Examiner*—Hemang Sangahvi
(74) *Attorney, Agent, or Firm*—Sughrue Mion, PLLC

(57) ABSTRACT

A variable optical attenuator includes an optical fiber on an incident side and an optical fiber on an emission side; a polarization rotator element that includes a liquid crystal layer and a pair of substrates that are arranged in such a manner that the liquid crystal layer is sandwiched between the substrates; and a Savart plate that is arranged between the optical fibers and the polarization rotator element. In the polarization rotator element, rotation of a polarizing direction is controlled by controlling a birefringence characteristic of liquid crystal, which is controlled by controlling alignment of the liquid crystal layer.

33 Claims, 16 Drawing Sheets

RELATION BETWEEN INCIDENT BEAM AND EMITTED BEAM

BOTTOM VIEW
(CRYSTALLOGRAPHIC AXIS DIRECTION)

VIEWED FROM SURFACE a IN CRYSTALLOGRAPHIC AXIS DIRECTION

VARIABLE OPTICAL ATTENUATOR AND OPTICAL FILTER

BACKGROUND OF THE INVENTION

1) Field of the Invention

The present invention relates to a variable optical attenuator and an optical filter that includes the variable optical attenuator.

2) Description of the Related Art

In recent years, large-capacity high-speed optical communications have been promoted. Accordingly, bandwidth extension is in increasing demand. To respond such demands, various optical devices have been developed and introduced. For example, a tunable filter technology such as a wavelength selection switch and a dynamic gain equalizer for Wavelength Division Multiplexing (WDM) in optical communications is an important technology in a dynamic optical network.

To achieve a tunable filter with high resolution, a free-space optical system has been suggested, which includes a lens, a diffraction grating, and an optical device with pixelized optical elements formed in an array. In such a free-space optical system, a light beam incident from outside via an optical fiber on an incident side (hereinafter, "incident-side optical fiber") is branched to a predetermined optical element pixel of the optical device, and the light branched is reflected from the optical element pixel. The light reflected is then multiplexed to enter (be coupled to) an optical fiber on an emission side (hereinafter, "emission-side optical fiber"), and is then emitted to outside.

In the free-space optical system, an amount of light entering the emission-side optical fiber can be adjusted by the optical device. In this example, the optical device corresponds to a variable optical attenuator that adjusts an amount of attenuation of incident light so as to adjust an amount of light. For such variable optical attenuator, which is formed in an array, for example, a technology of micro-electro-mechanical systems (MEMS) has been developed and applied, such as MEMS of an analog tilt mirror scheme or of a diffraction type, and a digital micromirror device (DMD).

There is another type of a variable optical attenuator that uses a liquid crystal technology besides the technology of MEMS. Such variable optical attenuator is one of important options for achieving a tunable device that meets the demands for the dynamic optical network, because of such advantages as large birefringence of liquid crystal, easy integration with a standard complementary metal oxide semiconductor (CMOS) circuit, and a high degree of maturity of liquid crystal technology derived from a technology for a liquid-crystal display.

Unlike the variable optical attenuator based on MEMS technology, the variable optical attenuator based on the liquid crystal technology does not require a movable component. In the MEMS, due to the movable component, such as a mirror, internal or external disturbances, such as friction, stiction (a phenomenon in which a movable component is attached to another component), vibration, and electrification are caused. Such troubles may be a factor of a failure in the variable optical attenuator. Therefore, there is a high possibility of failures in such variable optical attenuator based on the MEMS. On the other hand, in the variable optical attenuator based on the liquid crystal technology, the movable component is not required. Therefore, there is no possibility of failures due to such problems, and thus, the variable optical attenuator based on the liquid crystal technology has higher reliability.

Moreover, the variable optical attenuator based on the MEMS generally requires a higher driving voltage than that in the variable optical attenuator based on the liquid crystal technology. Furthermore, because of the movable component, a manufacturing process tends to be complex in the variable optical attenuator based on the MEMS. Compare to the variable optical attenuator based on the MEMS, the variable optical attenuator based on the liquid crystal technology requires a lower driving voltage and lower manufacturing cost. In addition, the variable optical attenuator based on the liquid crystal technology can be formed in a reduced size, and is suitable for integration with the standard CMOS circuit.

FIG. 28 is a schematic of a conventional variable optical attenuator that includes a liquid crystal element (for example, refer to Japanese Patent Application Laid-Open Publication No. 2001-13477). As shown in FIG. 28, an incident light L271 emitted through a fiber collimator 271 enters a polarized beam splitter 272 on an incident-side. The polarized beam splitter 272 is a polarizing and separating unit, and separates the incident light L271 into a p-polarized light beam and an s-polarized light beam. Both the p-polarized light beam and s-polarized light beam enter a liquid crystal element 276, which is a polarization rotator element.

The liquid crystal element 276 is formed with two pieces of 45-degree-twisted nematic liquid crystal cells (hereinafter, simply "liquid crystal cells") 274 and 275 that are laminated, and that are formed such that each of the liquid crystal cells 274 and 275 adjusts an applied voltage independently. In a process where the p-polarized light beam and the s-polarized light beam entering the liquid crystal element 276 pass through the liquid crystal cells 274 and 275, the amount of light emitted from the liquid crystal element 276 is adjusted.

The light beams emitted from the liquid crystal element 276 further enter a polarized beam splitter 273 on an emission side. The polarized beam splitter 273 is a polarized-light combining unit, in which the light beams are multiplexed. The light beams multiplexed are emitted as emitted light beams L272 and L273 from side surfaces 273a and 273b of the polarized beam splitter 273 via fiber collimators 278 and 279, respectively.

In the conventional variable optical attenuator described above, the polarized beam splitter 272 and the polarized beam splitter 273 are required to be provided separately on the incident side and the emission side. Therefore, the number of components increases, thereby making it difficult to reduce the size of the variable optical attenuator. Furthermore, such structure increases the manufacturing cost, and makes the manufacturing process complex.

In addition, in the process in which the p-polarized light beam and the s-polarized light beam pass through the polarized beam splitter 272 and the polarized beam splitter 273, a difference in optical path length occurs between the polarized beams. As a result, polarization mode dispersion (PMD) of the variable optical attenuator is deteriorated.

Moreover, if a polarization axis of each of the polarized beam splitter 272 and the polarized beam splitter 273 is not arranged at an appropriate angle with respect to a liquid crystal director of the liquid crystal element 276, polarization dependent loss (PDL) occurs.

SUMMARY OF THE INVENTION

It is an object of the present invention to at least solve the problems in the conventional technology.

A variable optical attenuator according to one aspect of the present invention includes an input and output unit that inputs light from outside and that outputs light to outside; a polarization rotator element that includes a liquid crystal, that reflects, toward the light input and output unit, the light input while controlling rotation of a polarizing direction, the liquid crystal sandwiched between a pair of electrodes and having a birefringence characteristic controlled by controlling a voltage applied between the electrodes, the rotation controlled by controlling the birefringence characteristic; and an optical-path-length correction plate that arranged between the input and output unit and the polarization rotator element, and that includes a birefringent plate for polarizing the light input and for combining the light polarized and reflected from the polarization rotator element, the birefringent plate guiding the light combined to the input and output unit. The optical-path-length correction plate is structured in such a manner that a difference in an optical path length between optical paths of the light polarized is correctable, the optical paths in the optical-path-length correction plate, and an amount of light output from the input and output unit is controlled by controlling the rotation of the polarizing direction.

An optical filter according to another aspect of the present invention includes a variable optical attenuator according to the above aspects.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are described in detail below with reference to the accompanying drawings. As an example of a variable optical attenuator according to embodiments of the present invention, a reflective variable optical attenuator having a liquid-crystal polarization rotator element is described. Also, as an example of the optical filter according to the present invention, a tunable filter having the variable optical attenuator is described.

Figure 1:
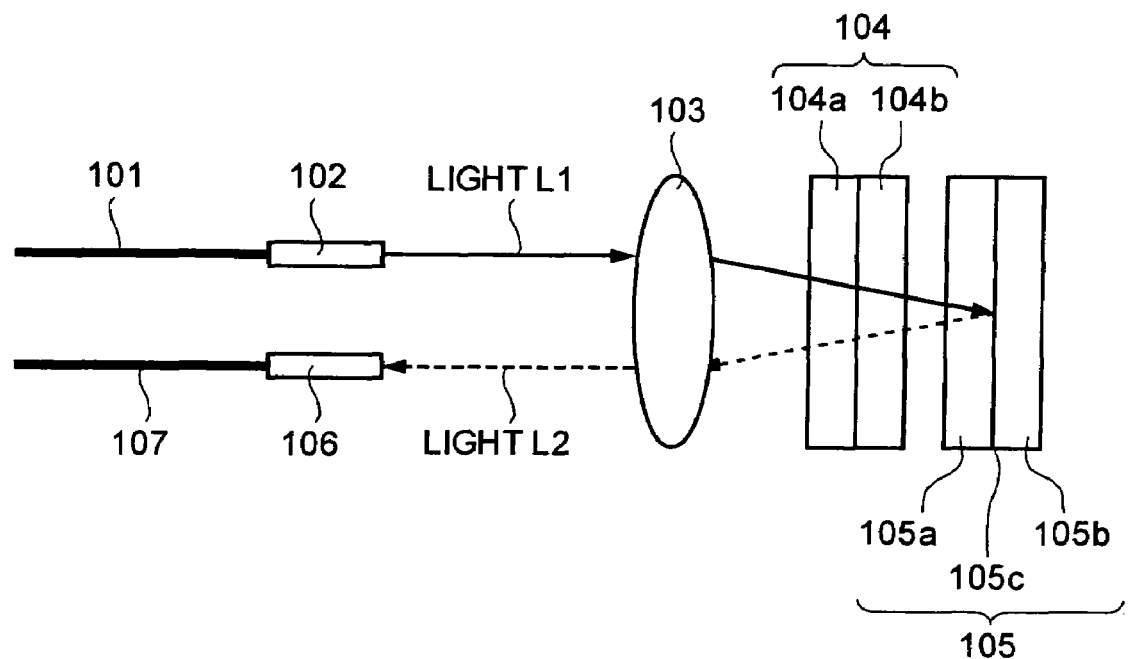
FIG. 1 is a schematic of a variable optical attenuator according a first embodiment of the present invention.
Figure 2:
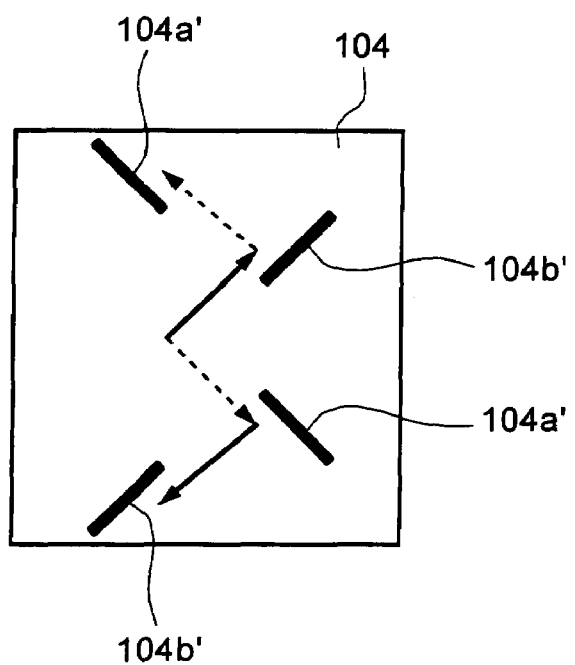
FIG. 2 is a front view of a Savart plate in the variable optical attenuator shown in FIG. 1.
Figure 3:
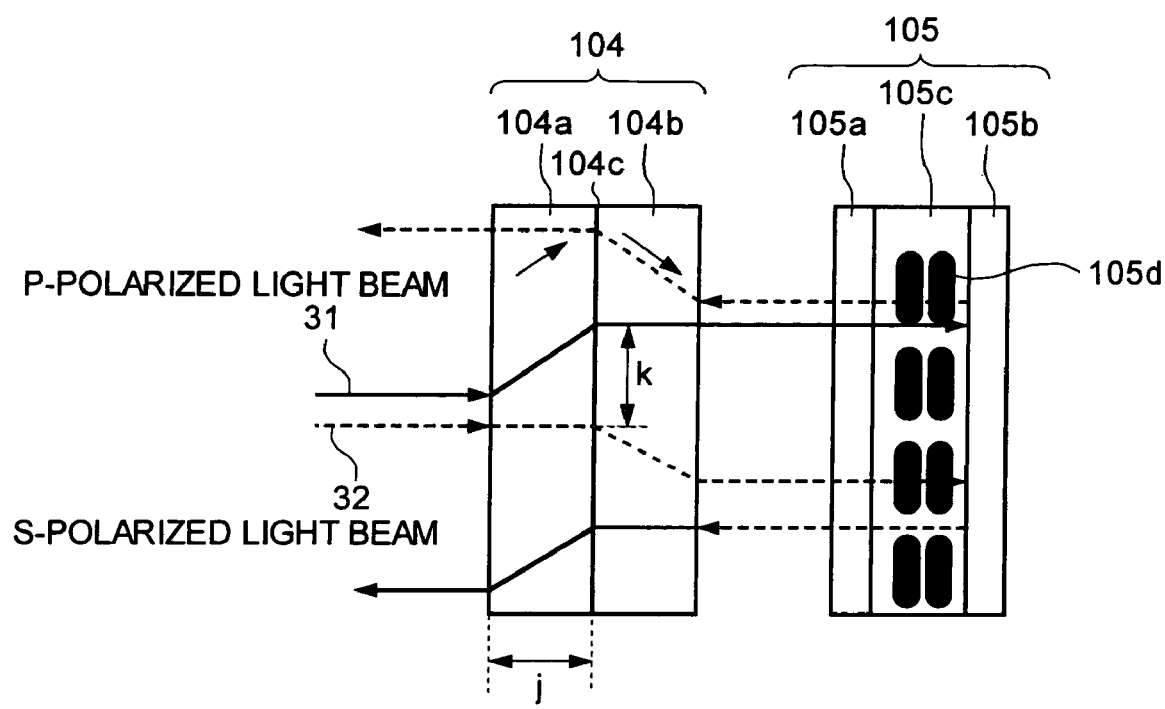
FIG. 3 is a schematic of the Savart plate and a liquid-crystal polarization rotator element shown in FIG. 1.
Figure 4:
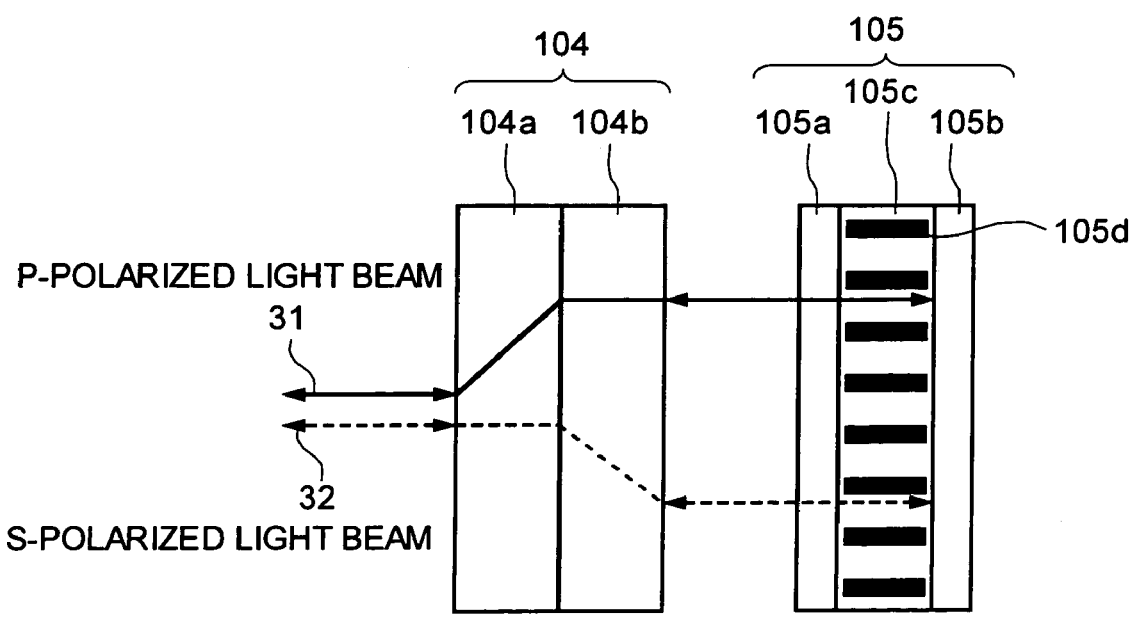
FIG. 4 is a schematic of the Savart plate and the liquid-crystal polarization rotator element shown in FIG. 1.

FIG. 1 is a schematic of a variable optical attenuator (VOA) according to a first embodiment of the present invention. FIG. 2 is a front view of a Savart plate in the variable optical attenuator shown in FIG. 1. FIGS. 3 and 4 are schematics of the variable optical attenuator.

As shown in FIG. 1, the variable optical attenuator includes, as main components, an incident-side optical fiber 101 having an end at which a fiber collimator 102 is placed, a lens 103, a Savart plate 104, a liquid-crystal polarization rotator element 105, and an emission-side optical fiber 107 having an end at which a fiber collimator 106 is placed. Here, the incident-side and emission-side optical fibers 101 and 107 are assumed to be single mode fibers (SMFs).

In this structure, the incident-side optical fiber 101, the fiber collimator 102, the lens 103, the emission-side optical fiber 107, and the fiber collimator 106 correspond to a light input and output unit, and the Savart plate 104 corresponds to a birefringent plate for correction of a difference in optical path length.

The components 101 to 107 are arranged so as to form an incident route and an emission route for light. Specifically, on the light incident route, light L1 entering the incident-side optical fiber 101 passes through the fiber collimator 102 and the lens 103 to enter the Savart plate 104. The light L1 passing through the Savart plate 104 further enters the liquid-crystal polarization rotator element 105, from which the light is reflected. On the light emission route, reflected light L2 passes, as emitted light, through the lens 103 again and the fiber collimator 106 to enter the emission-side optical fiber 107, and is then emitted to the outside.

The end of the incident-side optical fiber 101 at the fiber collimator 102 side and the end of the emission-side optical fiber 107 at the fiber collimator 106 side are arranged so as to be positioned at focuses of a front surface side of the lens 103. Also, a reflecting electrode 65 (see FIG. 6) of the liquid-crystal polarization rotator element 105 is placed so as to be positioned at a focus of a back surface side of the lens 103.

In the above, to describe the arrangement of the components 101 to 107 of the variable optical attenuator, the light incident and emission routes in the variable optical attenuator have been described in a simplified manner. In practice, however, as for the incident light L1 and the emitted light L2, separation of polarized components at the Savart plate 104 and rotation of the polarized light at the liquid-crystal polarization rotator element 105 have to be taken into consideration.

The Savart plate 104 is a birefringent plate formed by laminating two birefringent plates 104a and 104b. These birefringent plates 104a and 104b are both made of rutile (TiO$_2$), which is an anisotropic material. As shown in FIG. 2, the plates are laminated so that an optical axis 104a' of the birefringent plate 104a and an optical axis 104b' of the birefringent plate 104b are orthogonal to each other.

Here, the Savart plate 104 and the liquid-crystal polarization rotator element 105 are arranged so that the optical axes 104a' and 104b' of the birefringent plates 104a and 104b each form an appropriate angle with respect to a direction of a liquid crystal director when the liquid-crystal polarization rotator element 105 functions as a ¼ wave plate as described further below.

The material forming the birefringent plates 104a and 104b is not meant to be restricted to rutile, and may be another material. For example, the birefringent plates 104a and 104b may be made of yttrium vanadium oxide (YVO$_4$).

Figure 5:
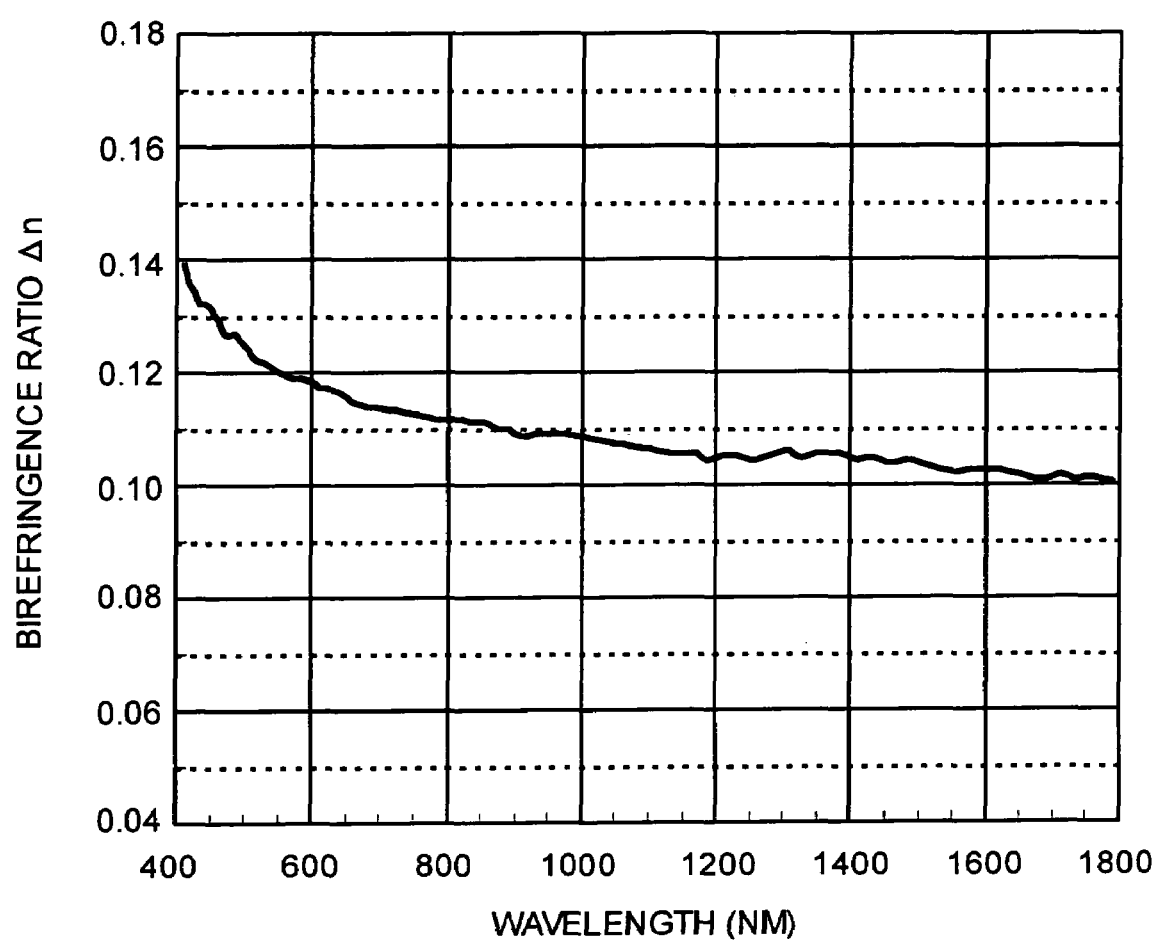
FIG. 5 is a characteristic plot of birefringence of a liquid crystal used in the liquid-crystal polarization rotator element.

FIGS. 5 to 13 are schematics for explaining the structure and operation of the liquid-crystal polarization rotator element 105. Specifically, FIG. 5 is a characteristic plot of birefringence of a liquid crystal used in the liquid-crystal polarization rotator element 105, wherein the horizontal axis represents a wavelength of light entering the liquid crystal and the vertical axis represents an effective birefringence ratio of the light.

FIGS. 6 to 9 are schematics for explaining the operation of the liquid crystal having a structure in which an electric field is formed on the liquid-crystal polarization rotator element 105 in a direction of thickness. FIGS. 10 to 13 are schematics for explaining the operation of the liquid crystal having a structure in which an electric field is formed on the liquid-crystal polarization rotator element 105 in a lateral direction (width direction).

Figure 6:
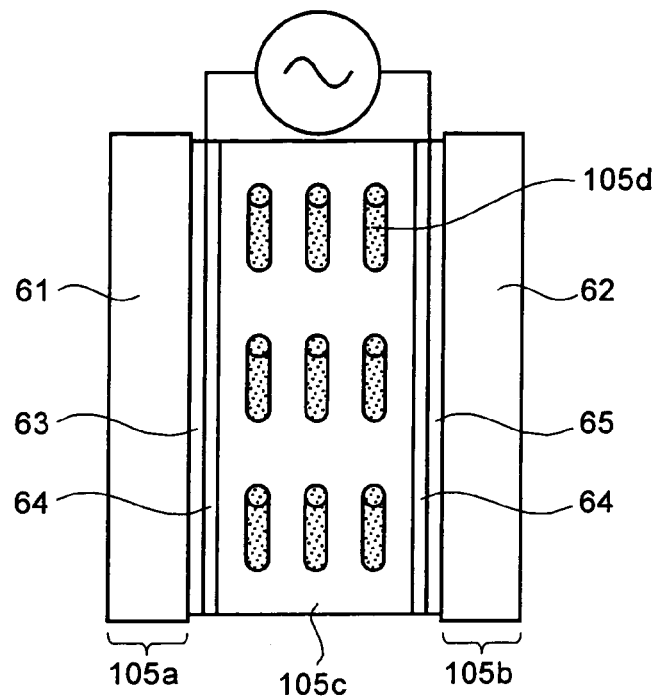
FIG. 6 is a schematic of liquid crystal molecules of the liquid-crystal polarization rotator element when an electric field in a direction of thickness is not formed with no voltage being applied.

For example, as shown in FIG. 6, the liquid-crystal polarization rotator element 105 (see FIG. 3) has a structure in which a liquid crystal layer 105c formed of liquid crystal molecules 105d (properly speaking, 105d denotes liquid crystal directors) is placed between a front substrate 105a and a back substrate 105b. The front substrate 105a is formed with an indium-tin oxide (ITO) film being formed as a transparent electrode 63 on a transparent substrate 61 and with an alignment layer 64 being formed on the ITO film. Here, as the transparent substrate 61, a glass substrate is used.

On the other hand, on the back substrate 105b, an aluminum (Al) film serving as an electrode and also a reflective film is formed on the surface of a silicon (Si) substrate 62 to the reflecting electrode 65. As such, the liquid-crystal polarization rotator element 105 is a reflective element. On the surface of the reflecting electrode 65, an alignment layer 64 is further formed. The alignment layers 64 formed on the front and back substrates 105a and 105b are polyimide alignment layers subjected to a rubbing process. The front substrate 105a and the back substrate 105b are spaced a predetermined distance apart from each other so that their alignment layers 64 are opposed to each other.

Here, although detailed representations are omitted, the transparent electrode 63 and the reflecting electrode 65 are connected to a driving circuit. For example, in this case, the driving circuit is implemented by a complementary metal oxide semiconductor (CMOS) circuit.

The liquid crystal layer 105c sandwiched between the front substrate 105a and the back substrate 105b is implemented by a nematic liquid crystal with homogeneous alignment. In such a nematic liquid crystal, as shown in FIG. 5, an effective birefringence ratio Δn has a wavelength dependency characteristic.

Here, the effective birefringence ratio Δn of the liquid crystal represents a difference between a refractive index ne in the longer axis (major axis) direction and a refractive index no in the shorter axis direction of the liquid crystal director, and is expressed by the following equation (1).

$$\Delta n = ne - no \tag{1}$$

The effective birefringence ratio Δn of the liquid crystal forming the liquid crystal layer 105c of the liquid-crystal polarization rotator element 105 is calculated, for example, by the following equation (2) from a phase difference Δφ found by a transmission spectroscopic ellipsometry scheme.

$$\Delta n = \lambda / (2\pi \cdot d) \times \Delta\phi \tag{2}$$

In equation (2), λ represents a wavelength of light entering the liquid crystal layer 105c, d represents a thickness of the liquid crystal layer 10λ5c, and Δφ represents a phase difference of light emitted from the liquid crystal layer 105c.

Next, a polarization rotating operation in the liquid-crystal polarization rotator element 105 is described. This polarization rotating operation directly contributes to an optical attenuation operation of the variable optical attenuator, which will be described further below.

A summary of the polarization rotating operation in the liquid-crystal polarization rotator element 105 is briefly described. In the liquid-crystal polarization rotator element 105, when no voltage or a low voltage is applied to the liquid crystal layer 105c, the liquid crystal molecules 105d in the liquid crystal layer 105c are aligned along the alignment layer 64, thereby regulating nematic liquid crystal alignment. Therefore, in this case, the liquid crystal layer 105c exhibits a birefringence characteristic, thereby causing the liquid-crystal polarization rotator element 105 to serve as a uniaxial wave plate.

Figure 7:
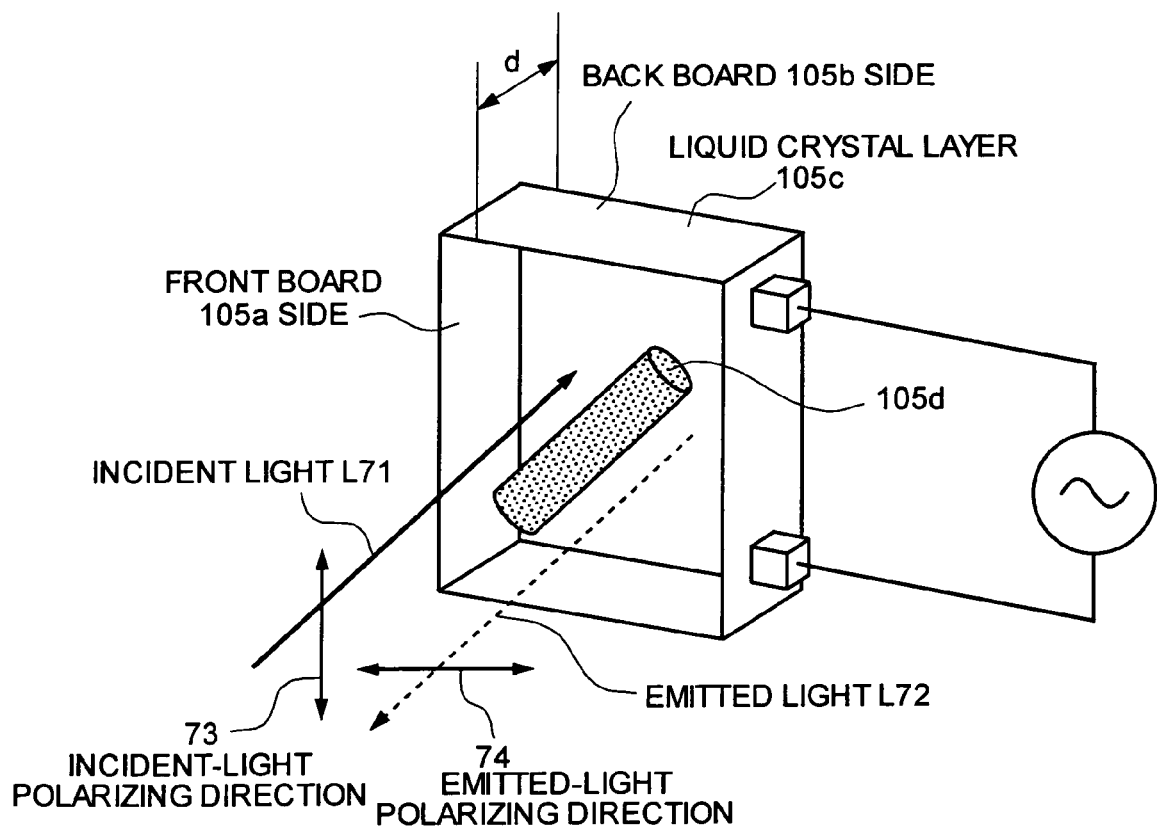
FIG. 7 is a schematic for explaining optical behavior in liquid crystal cells in the liquid-crystal polarization rotator element in FIG. 6.
Figure 11:
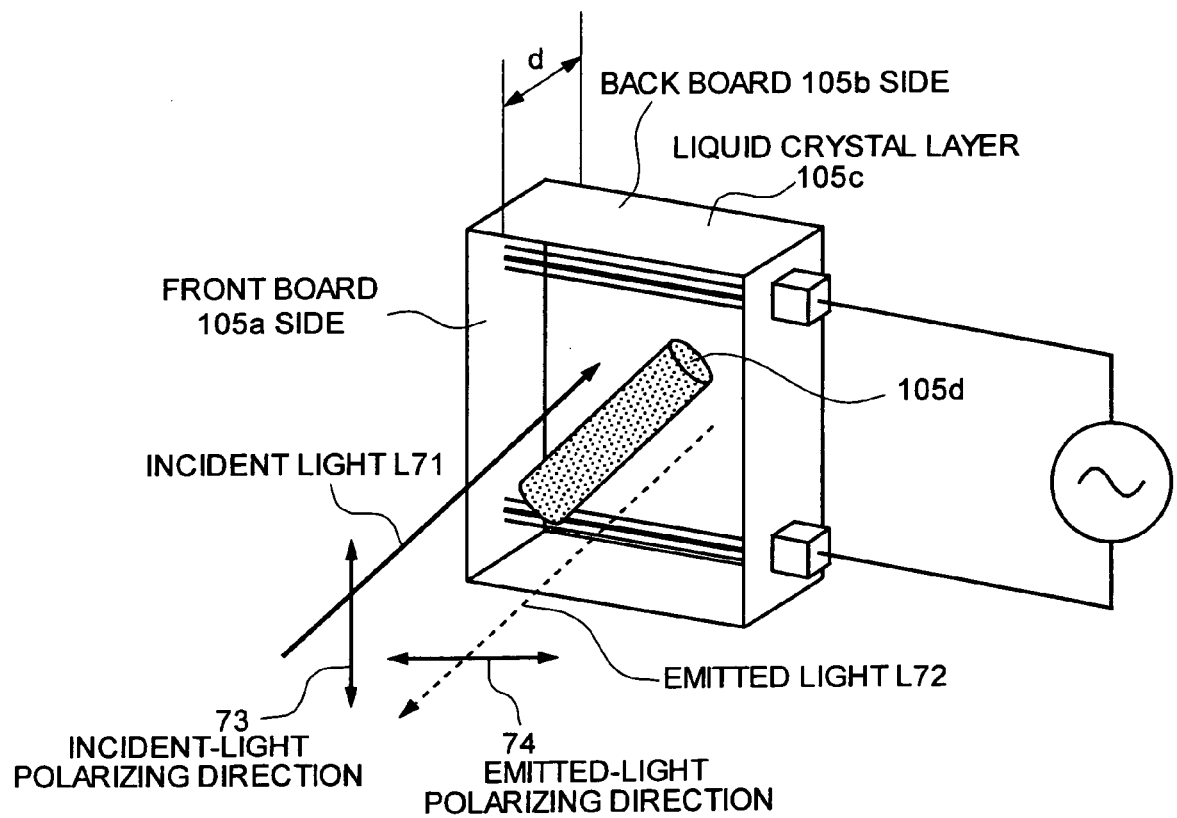
FIG. 11 is a schematic for explaining optical behavior in the liquid crystal cells in the liquid-crystal polarization rotator element shown in FIG. 10.

Here, the liquid-crystal polarization rotator element 105 is designed to serve as a ¼ wave plate when no voltage or a low voltage is applied. Also at this time, as shown in FIGS. 7 and 11 described further below, the liquid-crystal polarization rotator element 105 is designed so that the liquid crystal molecules 105d and incident light L71 form an angle of 45 degrees.

On the other hand, when a high voltage is applied to the liquid crystal layer 105c, the liquid crystal molecules 105d receives an influence of an electric field formed by the voltage and becomes in a state of nematic liquid crystal alignment. Therefore, the liquid-crystal polarization rotator element 105 does not server as a wave plate. As such, in the liquid-crystal polarization rotator element 105, with the magnitude of the applied voltage being adjusted, the alignment state of the liquid crystal molecules 105d and the birefringence characteristic of the liquid crystal layer 105c can be controlled. Thus, here, the liquid-crystal polarization rotator element 105 serves as a uniaxial variable wave plate.

Polarization rotation of the liquid-crystal polarization rotator element 105 is influenced by the magnitude of the voltage applied to the liquid crystal layer 105c and the orientation of the electric field formed by the voltage. In the following, the case in which an electric field in the direction of thickness (depth direction) is formed in the liquid crystal layer 105c and the case in which an electric field in the lateral direction (width direction) is formed therein are separately described.

First, the case in which an electric field in the direction of thickness is formed in the liquid crystal layer 105c is described. Initially, as shown in FIG. 6, when no voltage is applied to the liquid crystal layer 105c or when a low voltage is applied to the liquid crystal layer 105c to form a weak electric field in the direction of thickness, the liquid crystal molecules 105d of the liquid crystal layer 105c are in a state such that the longer axis (major axis) is approximately parallel to the surfaces of the front and back substrates 105a and 105b, that is, the major axis lies along those surfaces. Thus, the liquid crystal layer 105c exhibits a birefringence characteristic.

Here, the voltage applied to the liquid crystal layer 105c is an effective voltage determined by a voltage applied to the transparent electrode 63 of the front substrate 105a and a voltage applied to the reflecting electrode 65 of the back substrate 105b.

With the liquid crystal molecules 105d being in the state described above, as shown in FIG. 7, when light having a wavelength of λ (that is, the incident light L71) enters from the front substrate 105a side and then passes through the front substrate 105a to enter the liquid crystal layer 105c, a polarizing direction is rotated in the process where the incident light L71 is passing through the liquid crystal layer 105c. With this, retardation (Δn·d) of the incident light L71 emitted from the liquid crystal layer 105c becomes λ/2.

The incident light L71 emitted from the liquid crystal layer 105c then reaches the reflecting electrode 65 (see FIG. 6) of the back substrate 105b, where the incident light L71 is reflected. The reflected light passes again through the liquid crystal layer 105c as the emitted light L72 in a direction opposite to the direction of the incident light L71, and is then emitted to the front substrate 105a. While the emitted light L72 is passing through the liquid crystal layer 105c, the polarizing direction is further rotated. As a result, retardation (Δn·d) of the emitted light L72 from the transparent substrate 61 of the front substrate 105a to the outside becomes λ/4. Also, a polarizing direction 74 of the emitted light L72 is rotated by 90 degrees with respect to a polarizing direction 73 of the incident light L71. As such, in this case, the liquid-crystal polarization rotator element 105 functions as a ¼ wave plate.

Figure 8:
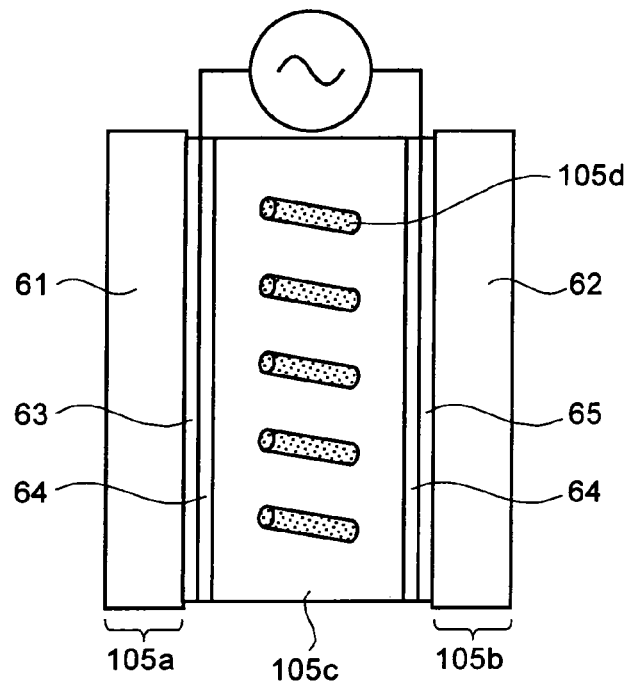
FIG. 8 is a schematic of the liquid crystal molecules of the liquid-crystal polarization rotator element when an electric field in the direction of thickness is formed with a high voltage being applied.
Figure 9:
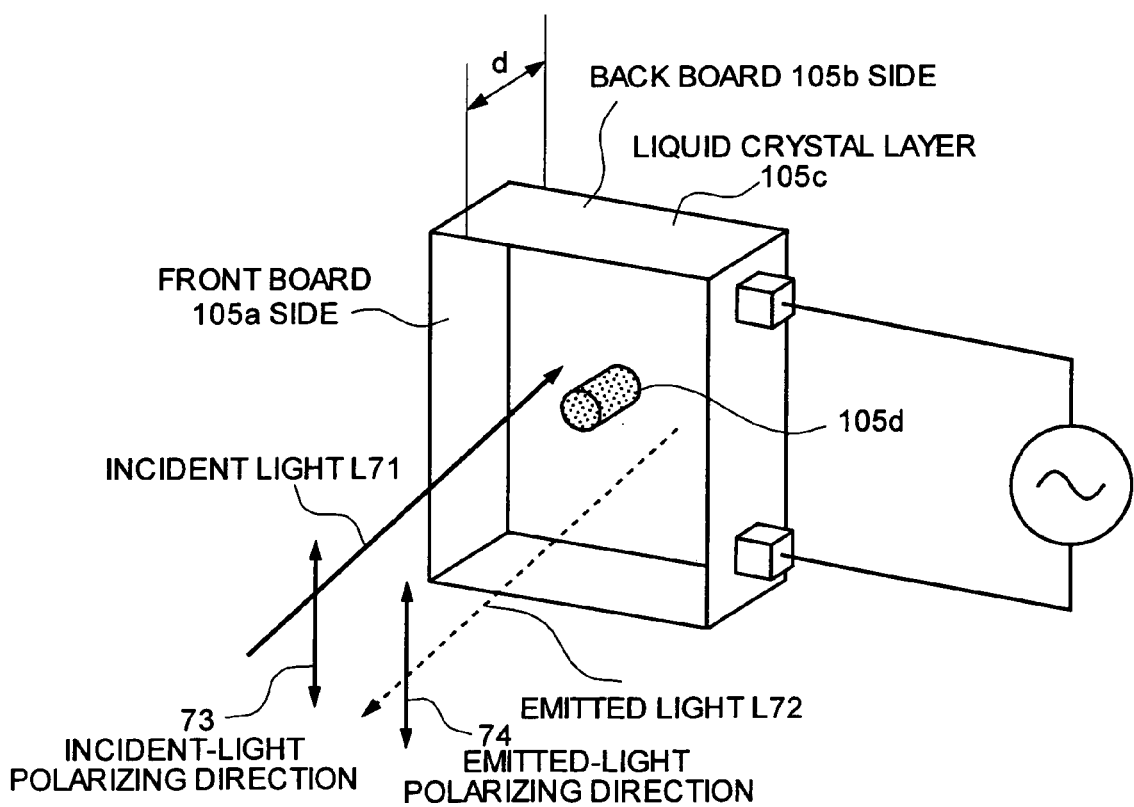
FIG. 9 is a schematic for explaining optical behavior in the liquid crystal cells in the liquid-crystal polarization rotator element shown in FIG. 8.

On the other hand, as shown in FIG. 8, when a high voltage is applied to the liquid crystal layer 105c to form a strong electric field in the direction of thickness of the liquid crystal layer 105c, the liquid crystal molecules 105d of the liquid crystal layer 105c are in a state such that the major axis is approximately perpendicular to the surfaces of the front and back substrates 105a and 105b, that is, the major axis lies between these substrates. Thus, in this case, the liquid crystal layer 105c loses a birefringence characteristic.

Therefore, with the liquid crystal molecules 105d being in the state described above, as shown in FIG. 9, when light having a wavelength of λ (that is, the incident light L71) enters from the front substrate 105a side and then passes through the front substrate 105a to enter the liquid crystal layer 105c, a polarizing direction is not changed in the process where the incident light L71 is passing through the liquid crystal layer 105c. Thus, retardation (Δn·d) of the incident light L71 emitted from the liquid crystal layer 105c is 0.

The incident light L71 emitted from the liquid crystal layer 105c then reaches the reflecting electrode 65 (see FIG. 8) of the back substrate 105b, where the incident light L71 is reflected. The reflected light passes again through the liquid crystal layer 105c as the emitted light L72 in a direction opposite to the direction of the incident light L71, and is then emitted to the front substrate 105a. Also while the emitted light L72 is passing through the liquid crystal layer 105c, the polarizing direction is not rotated. As a result, in this case, retardation (Δn·d) of the emitted light L72 from the transparent substrate 61 of the front substrate 105a to the outside is 0. The polarizing direction 74 of the emitted light L72 is identical to the polarizing direction 73 of the incident light L71. As such, in this case, the liquid-crystal polarization rotator element 105 does not function as a wave plate.

Next described is the case in which an electric field is formed in the lateral direction of the liquid crystal layer 105c of the liquid-crystal polarization rotator element 105, that is, a direction orthogonal to the direction of thickness described above, in other words, an extending direction of the surfaces of the front substrate 105a and the back substrate 105b.

Figure 10:
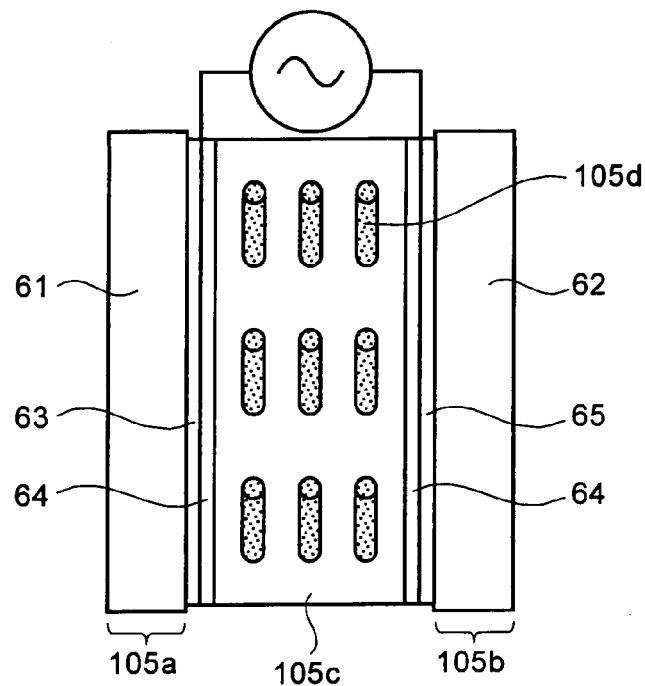
FIG. 10 is a schematic of the liquid crystal molecules of the liquid-crystal polarization rotator element when an electric field in a lateral direction is not formed with no voltage being applied.

First, as shown in FIG. 10, when no voltage is applied to the liquid crystal layer 105c or when a low voltage is applied to the liquid crystal layer 105c to form a weak electric field in the lateral direction, similarly to the case in FIG. 6, the liquid crystal molecules 105d of the liquid crystal layer 105c are in a state such that the major axis is approximately parallel to the surfaces of the front and back substrates 105a and 105b, that is, the major axis lies along those surfaces.

With the liquid crystal molecules 105d of the liquid crystal layer 105c being in the state described above, as shown in FIG. 11, when the incident light L71 having a wavelength of λ enters from the side of the transparent substrate 61 of the front substrate 105a and then passes through the front substrate 105a to enter the liquid crystal layer 105c, a polarizing direction is rotated in the process where the incident light L71 is passing through the liquid crystal layer 105c.

The incident light L71 emitted from the liquid crystal layer 105c then reaches the reflecting electrode 65 (see FIG. 10) of the back substrate 105b, where the incident light L71 is reflected. The reflected light passes again through the liquid crystal layer 105c as the emitted light L72 in a direction opposite to the direction of the incident light L71, and is then emitted to the front substrate 105a. While the emitted light L72 is passing through the liquid crystal layer 105c, the polarizing direction is further rotated. As a result, the polarizing direction 74 of the emitted light L72 is rotated by 90 degrees with respect to the polarizing direction 73 of the incident light L71.

Figure 12:
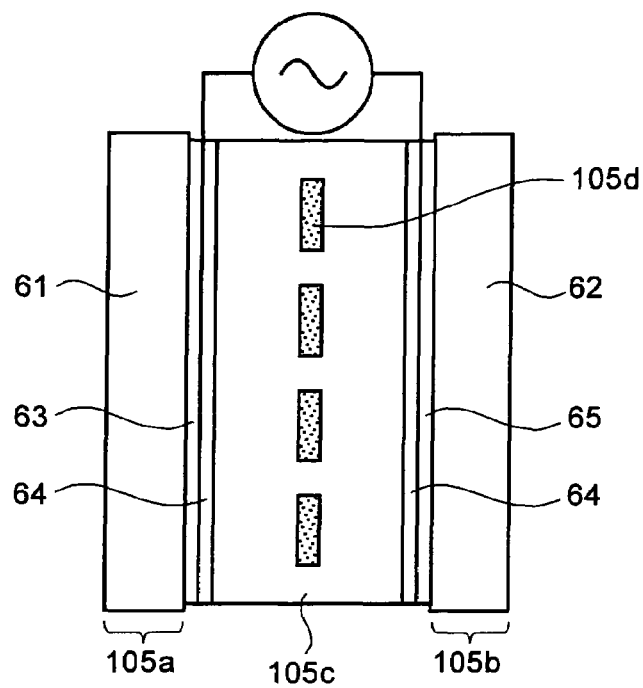
FIG. 12 is a schematic of the liquid crystal molecules of the liquid-crystal polarization rotator element when an electric field in a lateral direction is formed with a voltage being applied
Figure 13:
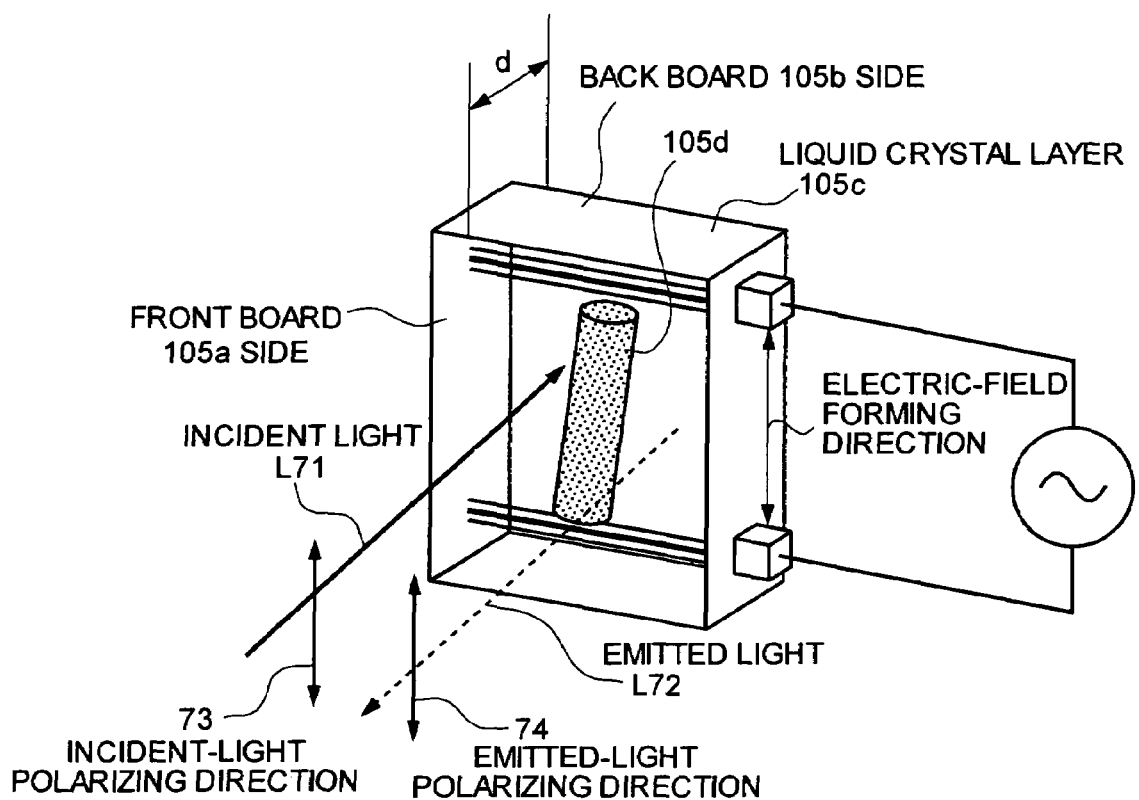
FIG. 13 is a schematic for explaining optical behavior in the liquid crystal cells in the liquid-crystal polarization rotator element shown in FIG. 12.

On the other hand, as shown in FIGS. 12 and 13, when a high voltage is applied to the liquid crystal layer 105c to form a strong electric field in the lateral direction of the liquid crystal layer 105c, the liquid crystal molecules 105d of the liquid crystal layer 105c are in a state such that, on a virtual plane parallel to the surfaces of the front and back substrates 105a and 105b, the major axis is parallel to an end side of each side surface of these substrates. As such, with an electric field being formed in the lateral direction, the direction of placing the major axis of the liquid crystal molecules 105d can be controlled.

With the liquid crystal molecules being in the state described above, as shown in FIG. 13, when the incident light L71 having a wavelength of λ enters from the front substrate 105a side and then passes through the front substrate 105a to enter the liquid crystal layer 105c, a polarizing direction is not changed in the process where the incident light L71 is passing through the liquid crystal layer 105c.

The incident light L71 emitted from the liquid crystal layer 105c then reaches the reflecting electrode 65 (see FIG. 12) of the back substrate 105b, where the incident light L71 is reflected. The reflected light passes again through the liquid crystal layer 105c as the emitted light L72 in a direction opposite to the direction of the incident light L71, and is then emitted to the front substrate 105a. Also while the emitted light L72 is passing through the liquid crystal layer 105c, the polarizing direction is not rotated. Therefore, in this case, the polarizing direction 74 of the emitted light L72 from the transparent substrate 61 of the front substrate 105a to the outside is identical to the polarizing direction 73 of the incident light L71.

Here, as will be described further below, the light having a wavelength of λ entering the liquid-crystal polarization rotator element 105 is separated by the Savart plate 104 (see FIG. 1) placed on the front surface side of the liquid-crystal polarization rotator element 105 into orthogonal two linear polarization components, that is, a p-polarized light beam and an s-polarized light beam. Thus, in the liquid-crystal polarization rotator element 105, the incident light L71 may be a p-polarized light beam or an s-polarized light beam.

In the liquid-crystal polarization rotator element 105, the polarization rotating operation described above with reference to FIGS. 6 to 13 is performed with the incident light L71 being any one of a p-polarized light beam or an s-polarized light beam.

Next, in consideration of the operation of the liquid-crystal polarization rotator element 105 as described above, the operation of the variable optical attenuator show in FIG. 1 is described.

As shown in FIG. 1, the incident light introduced to the incident-side optical fiber 101 becomes parallel light by the fiber collimator 102, and then enters the lens 103. The light L1 after passing through the lens 103 further enters the Savart plate 104.

As shown in FIGS. 3 and 4, in the birefringent plate 104a placed on the front surface of the Savart plate 104, the incident light is separated into two different light beams with their polarizing directions having an orthogonal relation to each other, that is, a p-polarized light beam 31 and an s-polarized light beam 32 obtained through linear polarization. Here, in FIGS. 3 and 4, for the convenience of description, it seems that the incident light has already been separated into the p-polarized light beam 31 and the s-polarized light beam 32 when the incident light enters the birefringent plate 104a. In practice, however, the incident light first enters the birefringent plate 104a and is then separated.

For example, the p-polarized light beam 31 obtained through separation proceeds through the birefringent plate 104a as being tilted according to the direction of the optical axis 104a' (see FIG. 2) of the birefringent plate 104a. On the other hand, the s-polarized light beam 32 proceeds horizontally through the birefringent plate 104a. As such, the p-polarized light beam 31 and the s-polarized light beam 32 proceeding through the birefringent plate 104a along different optical paths further enter the birefringent plate 104b.

Here, the birefringent plate 104a is made of rutile. Therefore, a distance k between the p-polarized light beam 31 and the s-polarized light beam 32 emitted from the birefringent plate 104a to the birefringent plate 104b is represented by $k=j/10$ using a thickness j of the birefringent plate 104a. As such, the p-polarized light beam 31 and the s-polarized light beam 32 proceed through the birefringent plate 104a along different optical paths, and therefore a difference occurs in both optical path lengths in the birefringent plate 104a. Here, the optical path length of the p-polarized light beam 31 is longer than the optical path length of the s-polarized light beam 32.

The p-polarized light beam 31 and the s-polarized light beam 32 entering the birefringent plate 104b proceed through the birefringent plate 104b along different optical paths. Here, in contrast to the case of the birefringent plate 104a described above, the p-polarized light beam 31 proceeds horizontally through the birefringent plate 104b, and the s-polarized light beam 32 proceeds through the birefringent plate 104b as being tilted according to the optical axis 104b' (see FIG. 2) of the birefringent plate 104b. As such, the p-polarized light beam 31 and the s-polarized light beam 32 proceed through the birefringent plate 104b along different optical paths, a difference occurs in both optical path lengths in the birefringent plate 104b. Here, the optical path length of the s-polarized light beam 32 is longer than the optical path length of the p-polarized light beam 31.

Here, in the Savart plate 104, the difference in optical path length occurring between the p-polarized light beam 31 and the s-polarized light beam 32 in the process where these beams are passing through the birefringent plate 104a is equal to the difference in optical path length occurring between the p-polarized light beam 31 and the s-polarized light beam 32 in the process where these beams are passing through the birefringent plate 104b. Therefore, when viewed as the entire Savart plate 104, the differences in optical path length occurring between the p-polarized light beam 31 and the s-polarized light beam 32 in the birefringent plates 104a and 104b cancel out each other. Therefore, the optical path lengths of the p-polarized light beam 31 and the s-polarized light beam 32 are equal to each other.

The p-polarized light beam 31 and the s-polarized light beam 32 passing through the Savart plate 104 in the manner described above further enter the liquid-crystal polarization element 105 from the front substrate 105*a* side. Then, these beams pass through the liquid crystal layer 105*c*, and are then reflected by the reflecting electrode 65 (see FIG. 6) of the back substrate 105*b*. The reflected p-polarized light beam 31 and s-polarized light beam 32 pass again through the liquid crystal layer 105*c*, and are then emitted from the front substrate 105*a* to the Savart plate 104.

Here, such behaviors of the p-polarized light beam 31 and the s-polarized light beam 32 in the liquid-crystal polarization rotator element 105 vary, as described with reference to FIGS. 6 to 13, depending on the state of the liquid crystal molecules 105*d* of the liquid crystal layer 105*c* determined by the voltage applied to the liquid crystal layer 105*c*. Therefore, in the following, the case in which no voltage or a low voltage is applied to the liquid-crystal polarization rotator element 105 and the case in which a high voltage is applied thereto are separately described.

Here, a voltage applied to the liquid crystal layer 105*c* may form an electric field in the direction of thickness of the liquid crystal layer 105*c* as shown in FIGS. 6 to 9, an electric field in the lateral direction thereof as shown in FIGS. 10 to 13, or both of these electric fields.

First, when no voltage or a low voltage is applied to the liquid crystal layer 105*c* of the liquid-crystal polarization rotator element 105, as described with reference to either or both of FIGS. 6 and 7 and FIGS. 10 and 11, the polarizing direction of the p-polarized light beam 31 and the s-polarized light beam 32 reflected and emitted from the liquid-crystal polarization rotator element 105 is rotated by 90 degrees with respect to the polarizing direction of the p-polarized light beam 31 and the s-polarized light beam 32 entering the liquid-crystal polarization rotator element 105.

As shown in FIG. 3, the p-polarized light beam 31 and the s-polarized light beam 32 emitted from the liquid-crystal polarization rotator element 105 with their polarizing directions being rotated again enter the birefringent plate 104*b* of the Savart plate 104. At this time, with both of the polarizing directions of the p-polarized light beam 31 and the s-polarized light beam 32 being rotated by 90 degrees by the liquid-crystal polarization rotator element 105, the incident optical paths of the p-polarized light beam 31 and the s-polarized light beam 32 to the birefringent plate 104*b* are different from the emission optical paths thereof from the birefringent plate 104*b* as described above to the liquid-crystal polarization rotator element 105.

The p-polarized light beam 31 entering the birefringent plate 104*b* horizontally proceeds through the birefringent plate 104*b* to reach the birefringent plate 104*a*. Then, after proceeding through the birefringent plate 104*a* along the optical axis 104*a*' (see FIG. 2) as being tilted, the p-polarized light beam 31 is emitted from the birefringent plate 104*a* to the outside. Here, as described above, the p-polarized light beam 31 enters the birefringent plate 104*b* via an optical path different from the optical path when entering. Therefore, the optical path along which the light beam sequentially passes through the birefringent plates 104*b* and 104*a* is different from that when first entering.

On the other hand, the s-polarized light beam 32 entering the birefringent plate 104*b* proceeds through the birefringent plate 104*b* along the optical axis 104*b*' (see FIG. 2) as being tilted to reach the birefringent plate 104*a*. Then, after horizontally proceeding through the birefringent plate 104*a*, the s-polarized light beam 32 is emitted from the birefringent plate 104*a* to the outside. Here, as described above, the s-polarized light beam 32 enters the birefringent plate 104*b* via an optical path different from the optical path when entering. Therefore, the optical path along which the light beam sequentially passes the birefringent plates 104*b* and 104*a* is different from that when first entering.

As described above, when the p-polarized light beam 31 and the s-polarized light beam 32 sequentially pass through the birefringent plates 104*b* and 104*a*, similarly to the case of first entering as described above, the difference in optical path length occurring between the p-polarized light beam 31 and the s-polarized light beam 32 in the birefringent plate 104*b* and the difference in optical path length occurring between the p-polarized light beam 31 and the s-polarized light beam 32 in the birefringent plate 104*a* cancel out each other. Therefore, when viewed as the entire Savart plate 104, the difference in optical path length between the p-polarized light beam 31 and the s-polarized light beam 32 has been solved.

The p-polarized light beam 31 and the s-polarized light beam 32 emitted from the Savart plate 104 pass through the lens 103, as shown in FIG. 1. In this process, the p-polarized light beam 31 and the s-polarized light beam 32 are re-combined. Here, the p-polarized light beam 31 and the s-polarized light beam 32 to be combined each have passed along the emission optical path different from the optical path at the time of first entering with the polarizing direction being rotated by the liquid-crystal polarization rotator element 105 as described above. Therefore, an optical path of the emitted light L2 obtained through combing both light beams is shifted from a position through which the emitted light L2 can enter the emission-side optical fiber 107.

Therefore, in this case, the emitted light L2 does not enter the emission-side optical fiber 107. Thus, the variable optical attenuator is a normally-off (-close)-type variable optical attenuator in which the emitted light L2 to the outside is 0 when no voltage is applied to the liquid-crystal polarization rotator element 105.

On the other hand, when a high voltage is applied to the liquid crystal layer 105*c* of the liquid-crystal polarization rotator element 105, as described with reference to either or both of FIGS. 8 and 9 and FIGS. 12 and 13, the polarizing directions of the p-polarized light beam 31 and the s-polarized light beam 32 reflected and emitted from the liquid-crystal polarization rotator element 105 are not rotated, and are identical to those at the time of first entering the liquid-crystal polarization rotator element.

As shown in FIG. 4, the p-polarized light beam 31 and the s-polarized light beam 32 emitted from the liquid-crystal polarization rotator element 105 with their polarizing directions being retained as those at the time of first entering again enter the birefringent plate 104*b* of the Savart plate 104. At this time, the p-polarized light beam 31 and the s-polarized light beam 32 are in the same polarizing directions as those at the time of first entering. Therefore, the incident optical paths of the p-polarized light beam 31 and the s-polarized light beam 32 to the birefringent plate 104*b* are identical to the emission optical paths from the birefringent plate 104*b* to the liquid-crystal polarization rotator element 105.

The p-polarized light beam 31 entering the birefringent plate 104*b* horizontally proceeds through the birefringent plate 104*b* to reach the birefringent plate 104*a*. Then, after proceeding through the birefringent plate 104*a* along the optical axis 104*a*' (see FIG. 2) as being tilted, the p-polarized light beam 31 is emitted from the birefringent plate 104*a*. Here, the p-polarized light beam 31 enters the birefringent plate 104*b* along the same optical path as that at the time of first entering as described above. Therefore, the optical path along which the light beam sequentially passes through the birefringent plates 104b and 104a is identical to that at the time of entering.

On the other hand, the s-polarized light beam 32 entering the birefringent plate 104b proceeds through the birefringent plate 104b along the optical axis 104'b (see FIG. 2) as being tilted to reach the birefringent plate 104a. Then, after horizontally proceeding through the birefringent plate 104a, the s-polarized light beam 32 is emitted from the birefringent plate 104a to the outside. The s-polarized light beam 32 enters the birefringent plate 104b along the same optical path as that at the time of first entering as described above. Therefore, the optical path along which the light beam sequentially passes through the birefringent plates 104b and 104a are identical to that at the time of first entering.

As described above, when the p-polarized light beam 31 and the s-polarized light beam 32 sequentially pass through the birefringent plates 104b and 104a, similarly to the case of first entering as described above, the difference in optical path length occurring between the p-polarized light beam 31 and the s-polarized light beam 32 in the birefringent plate 104b and the difference in optical path length occurring between the p-polarized light beam 31 and the s-polarized light beam 32 in the birefringent plate 104a cancel out each other. Therefore, when viewed as the entire Savart plate 104, the difference in optical path length between the emitted p-polarized light beam 31 and the s-polarized light beam 32 has been solved.

The p-polarized light beam 31 and the s-polarized light beam 32 emitted from the Savart plate 104 pass, as shown in FIG. 1, through the lens 103. In this process, the p-polarized light beam 31 and the s-polarized light beam 32 are recombined. Here, the p-polarized light beam 31 and the s-polarized light beam 32 to be combined pass along the optical path identical to the optical path at the time of first entering as described above. Therefore, an optical path of the emitted light L2 obtained by combing both light beams coincides with the position through which the emitted light L2 can enter the emission-side optical fiber 107. Therefore, in this case, the structure is such that the emitted light L2 enters the emission-side optical fiber 107.

Furthermore, in the above, the case in which the liquid-crystal polarization rotator element 105 functions as a ¼ wave plate, thereby not allowing the emitted light to be introduced to the emission-side optical fiber 107 (see FIG. 3) and the case in which the liquid-crystal polarization rotator element 105 does not function as a wave plate, thereby allowing a maximum amount of the emitted light to be introduced to the emission-side optical fiber 107 (see FIG. 4) have been described. By adjusting the magnitude of voltage to be applied to the liquid crystal layer 105c of the liquid-crystal polarization rotator element 105 to either one of the low voltage and the high voltage to adjust the alignment state of the liquid crystal molecules 105d to either one of those shown in FIGS. 3 and 4, thereby making it possible to adjust the amount of light to be introduced to the emission-side optical fiber 107.

That is, by adjusting the voltage applied to the liquid-crystal polarization rotator element 105, the amount of light to be emitted from the variable optical attenuator can be changed from 0 to a maximum value. Here, the maximum amount of the emitted light of the variable optical attenuator is an amount of light when incident light is emitted without being attenuated, that is, an amount equal to the amount of incident light to the variable optical attenuator.

In the above description, an angle formed by an incident plane formed by the incident light L1 and the emitted light L2 at the Savart plate 104 side of the lens 103 and a plane formed by two optical axes in the Savart plate 104 has not been specifically mentioned. However, if the incident angle of the light L1 is large, the incident plane and the plane formed by two optical axes are preferably orthogonal to each other because the difference in optical path length occurring between the p-polarized light beam 31 and the s-polarized light beam 32 due to tilted entering can be reduced.

Changes in the amount of emitted light in such a variable optical attenuator are described as follows by using equation (3) indicative of an amount of optical attenuation in the variable optical attenuator.

$$\mathrm{ATT}(V) = -10\ \log(\cos^2[2\pi\Delta n\cdot d/\lambda]) \tag{3}$$

First, the case in which no voltage or a low voltage is applied to the liquid-crystal polarization rotator element 105 (see FIG. 3) is described. In this case, the liquid-crystal polarization rotator element 105 functions as a ¼ wave plate, and therefore the retardation $\Delta n\cdot d$ of the light emitted from the liquid-crystal polarization rotator element 105 (specifically, the p-polarized light beam 31 and the s-polarized light beam 32) is $\lambda/4$. Therefore, when $\Delta n\cdot d = \lambda/4$ is substituted into equation (3), an amount of optical attenuation ATT of the variable optical attenuator in this case can be calculated.

Specifically, when $\Delta n\cdot d = \lambda/4$ is substituted into equation (3), the following equation (3') is obtained.

$$\mathrm{ATT}(V) = -10\ \log\ \cos^2(\pi/2) \tag{3'}$$

$\cos^2(\pi/2) = 0$, therefore, based on the equation (3'), the amount of optical attenuation ATT of the variable optical attenuator is $\infty$. The case in which the amount of optical attenuation ATT of the variable optical attenuator is $\infty$ means that the amount of emitted light from the variable optical attenuator is 0.

On the other hand, when a high voltage is applied to the liquid-crystal polarization rotator element 105 (see FIG. 4), as described above, the liquid-crystal polarization rotator element 105 does not rotate the polarizing direction. Therefore, the retardation $\Delta n\cdot d$ of the light emitted from the liquid-crystal polarization rotator element 105 (specifically, the p-polarized light beam 31 and the s-polarized light beam 32) is 0. Therefore, when $\Delta n\cdot d = 0$ is substituted into equation (3), the amount of optical attenuation ATT of the variable optical attenuator in this case can be calculated.

Specifically, when $\Delta n\cdot d = 0$ is substituted into equation (3), the following equation (3") is obtained.

$$\mathrm{ATT}(V) = -10\ \log\ \cos^2 0 \tag{3"}$$

Here, $\cos^2 0 = 1$. Therefore, based on equation (3"), the amount of optical attenuation ATT of the variable optical attenuator is 0. The case in which the amount of optical attenuation ATT of the variable optical attenuator is 0 means that the amount of emitted light from the variable optical attenuator is at maximum and, more specifically, is equal to the amount of incident light.

Furthermore, when the voltage applied to the liquid-crystal polarization rotator element 105 is changed from the low voltage at which the amount of optical attenuation ATT of the variable optical attenuator is $\infty$ to the high voltage at which the amount of optical attenuation ATT is 0, the retardation $\Delta n\cdot d$ of the light emitted from the liquid-crystal polarization rotator element 105 takes a value in a range from 0 to $\lambda/4$. Therefore, by substituting a value in those range into equation (3), the amount of optical attenuation ATT takes a value in a range from 0 to ∞. Thus, it is evident from equation (3) above that, by adjusting the voltage applied to the liquid-crystal polarization rotator element 105 in the manner described above, the amount of optical attenuation of the variable optical attenuator can be arbitrarily adjusted.

As described above, according to the variable optical attenuator of the present embodiment, with the Savart plate 104 being placed, the difference in optical path length occurring between the separated p-polarized light beam 31 and s-polarized light beam 32 can be reduced. As a result, reduction in PDL and PMD can be attained. Therefore, light having a desired wavelength can be adjusted with excellent accuracy so as to have a desired amount of light.

Also, in this case, such an effect is achieved by a simple structure, that is, only by placing a Savart-plate. Therefore, a small-sized variable optical attenuator having a small number of components and easy to manufacture at low cost can be achieved.

Furthermore, unlike the variable optical attenuator using MEMS, no movable component is required. Therefore, high reliability can be achieved. Still further, driving at a low voltage is possible.

The variable optical attenuator according to the present embodiment described above is an exemplary attenuator operating as a normally-off-type attenuator. According to this structure, when a high voltage is applied to the liquid crystal layer 105*c* of the liquid-crystal polarization rotator element 105 for changing the polarizing direction of the incident polarized light, the amount of emitted light can be maximized. However, attenuation caused by residual birefringence occurs. To improve this attenuation, a residual birefringence correction plate (not shown) having a crystallographic axis orthogonal to the liquid crystal molecules 105*d* of the liquid crystal layer 105*c* is preferably provided between the front substrate 105*a* forming the liquid-crystal polarization rotator element 105 and the Savart plate 104 shown in FIG. 1. More preferably, this residual birefringence correction plate is provided so as to adhere to a surface opposite to the liquid crystal layer 105*c* of the front substrate 105*a*. With this structure, the attenuation of the amount of emitted light described above can be improved.

Also, in place of the normally-off-type variable optical attenuator according to the present embodiment described above, a normally-on (-open)-type variable optical attenuator can be used to achieve the effect of the present invention, wherein the amount of emitted light from the liquid-crystal polarization rotator element 105 is minimized when a low voltage is applied to the liquid crystal layer 105*c* of the liquid-crystal polarization rotator element 105; the amount of emitted light is maximized when a high voltage is applied thereto; However, the amount of emitted light is maximized when a low voltage is applied thereto; and the amount of emitted light is minimized when a predetermined high voltage is applied thereto.

When such a normally-on-type variable optical attenuator is used, a switching-mode reversing wave plate (not shown), such as a crystal plate, having a crystallographic axis in a direction of canceling the retardation of the liquid-crystal polarization rotator element 105 is further placed between the front substrate 105*a* forming the liquid-crystal polarization rotator element 105 and the Savart plate 104 shown in FIG. 1. With this, the variable optical attenuator has a structure in which combined birefringence of this switching-mode reversing wave plate and the liquid-crystal polarization rotator element 105 is minimized when the low voltage is applied. Thus, a normally-on-type variable optical attenuator can be achieved wherein the amount of emitted light is maximized when the low voltage is applied and the amount of emitted light is minimized when the predetermined high voltage is applied.

Furthermore, in place of the structure described above, the normally-on-type variable optical attenuator may have a structure in which an alignment layer 64 (see FIG. 6) is formed through an orthorhombic vapor deposition scheme by using, for example, silicon oxide, so that a pretilt angle, which represents a direction of initial alignment, is almost vertical and homeotropic molecular alignment using a negative-type liquid crystal is used for the liquid crystal layer 105*c*.

Still further, in place of the structure described above, the normally-on-type variable optical attenuator may have a structure in which the direction of 1 the liquid crystal molecules 105*d* of the liquid crystal layer 105*c* is set so that the incident-light polarizing direction 73 (see FIG. 11) is parallel to the liquid crystal layer 105*c* when a low voltage is applied.

Figure 14:
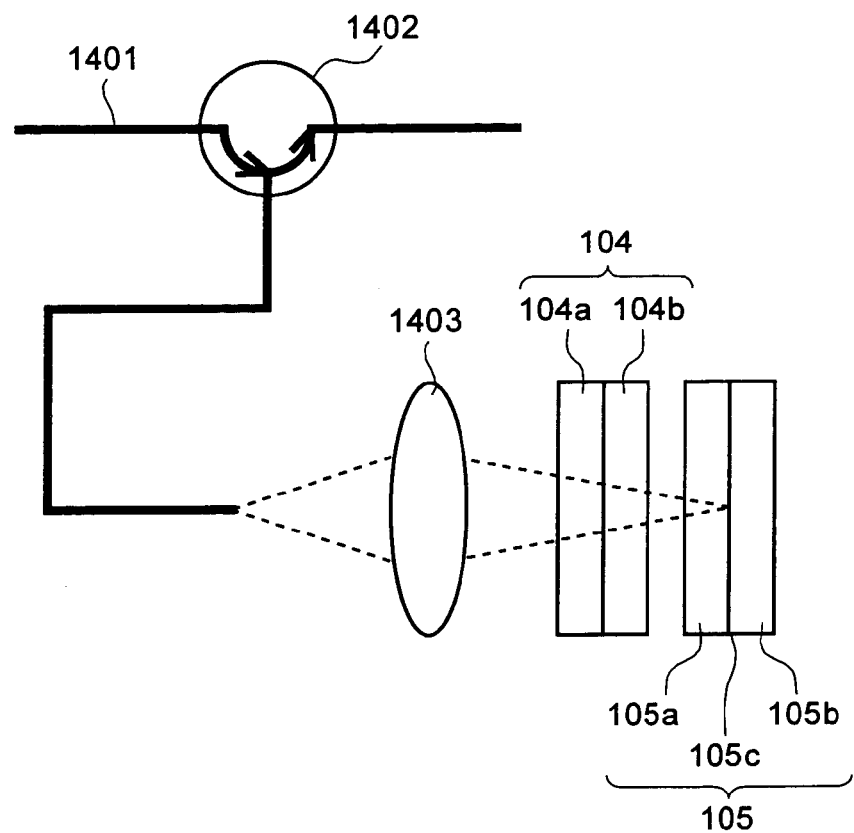
FIG. 14 is a schematic of a variable optical attenuator according a second embodiment of the present invention.

FIG. 14 is a schematic of the structure of a variable optical attenuator according to a second embodiment of the present invention. As shown in FIG. 14, in the variable optical attenuator according to the present embodiment, an input of light to the variable optical attenuator and an output of light from the variable optical attenuator are provided via a common optical fiber 1401. Also, the optical fiber 1401 is connected to an optical circulator 1402 that separates the incident light and the emitted light.

Also, a compound lens 1403 that collimates and gathers the incident light from the optical fiber 1401 at the time of first entering and the emitted light entering the optical fiber 1401 at the time of emission is placed between an end of the optical fiber 1401 and the Savart plate 104. Other than that, the second embodiment is similar to the first embodiment.

In the operation of the variable optical attenuator according to the present embodiment, light enters the variable optical attenuator via the optical fiber 1401. After passing through the compound lens 1403, this incident light reaches the Savart plate 104 and then the liquid-crystal polarization rotator element 105 in sequence. Then, light reflected on the liquid-crystal polarization rotator element 105 proceeds, as emitted light, along a path opposite to the path at the time of first entering.

With this, as described in the first embodiment, the incident light is attenuated as appropriate by the operation of the liquid-crystal polarization rotator element 105, and the amount of emitted light is adjusted to be a desired amount of light. When the emitted light is emitted via the optical fiber 1401 to the outside, the optical circulator 1402 switches the optical path in the optical fiber 1401 for separating the incident light and the emitted light.

Also in the variable optical attenuator having the structure as described above according to the present embodiment, an effect similar to the effect described in the first embodiment is achieved.

Furthermore, in the variable optical attenuator according to the present embodiment, a common optical fiber is used for light entering and emission. Therefore, the structure can be further simplified.

Figure 15:
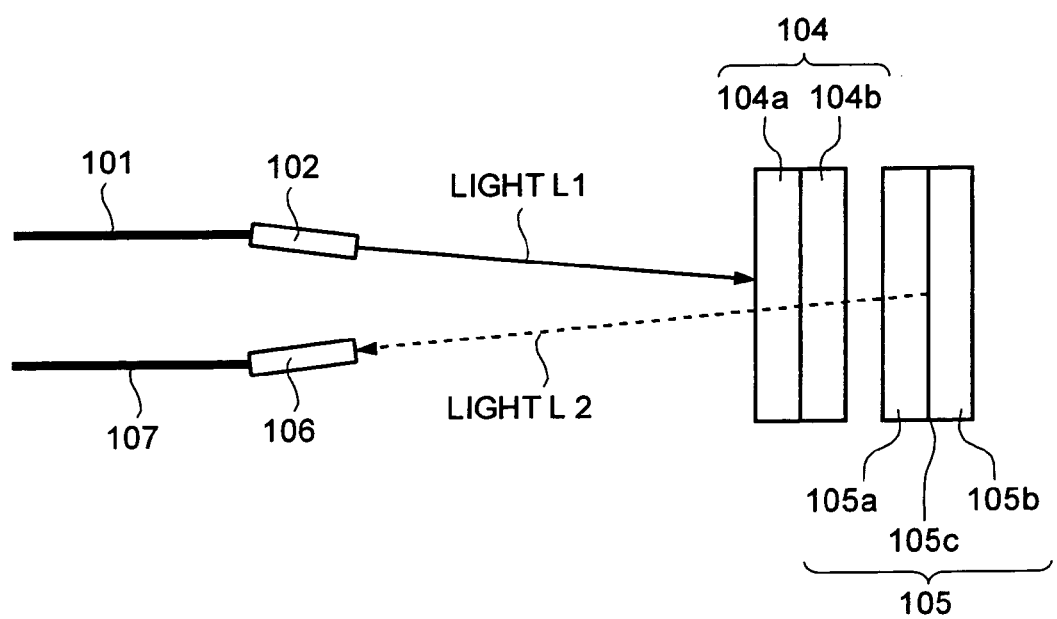
FIG. 15 is a schematic of a variable optical attenuator according a third embodiment of the present invention.

FIG. 15 is a schematic of a variable optical attenuator according to a third embodiment of the present invention. As shown in FIG. 15, in the variable optical attenuator according to the present embodiment, the fiber collimator 102 provided at the end of the incident-side optical fiber 101 is structured so as to cause a beam diameter of the light L1 emitted through the incident-side optical fiber 101 to be equal to or smaller than 50 micrometers (μm). Also, the fiber collimator 106 provided at the end of the emission-side optical fiber 107 is structured so as to cause a beam diameter of the light L2 entering the emission-side optical fiber 107 to be equal to or smaller than 50 μm.

As such, according to the present embodiment unlike the first embodiment, with the use of the fiber collimators 102 and 106 capable of reducing the beam diameter of the light, an optical system, such as a lens, is not required to be placed in front of the Savart plate. Therefore, the number of components can be reduced, thereby achieving downsizing. Here, if the Savart plate 104 is allowed to have a large thickness, the beam diameter does not have to be reduced. In this case, for example, although not shown, the incident-side optical fiber 101 and the emission-side optical fiber can have a structure in which these fibers are connected to the same two-core fiber collimator.

Also in the variable optical attenuator having the structure as described above according to the present embodiment, an effect similar to the effect described in the first embodiment is achieved.

In the first to third embodiments, the case in which the transparent electrode 63 made of an ITO film is formed on the front substrate 105a of the liquid-crystal polarization rotator element 105 have been described. In a fourth embodiment according to the present invention, a variable optical attenuator having a structure in which, in place of an ITO film, an ITiO film having indium doped with titanium (Ti) is included in the liquid-crystal polarization rotator element 105, is described below. Here, in the present embodiment, the structure may take the structure of any one of the first to third embodiments except for the ITiO film, and therefore is not described herein.

As shown in FIG. 6, in the operation of the variable optical attenuator on the light in a wavelength band of the near-infrared region, the transmittance of a transparent conductive film provided as the transparent electrode 63 on the front substrate 105a of the liquid-crystal polarization rotator element 105 is important. In general, in liquid crystal elements for use in a liquid crystal display, an ITO film having low resistance is used as the transparent conductive film forming the transparent electrode.

The ITO film generally exhibits a high reflectivity, which is caused by plasma reflection, in the near-infrared region. Therefore, when the ITO film is used as a transparent electrode of the liquid crystal element, electron concentration of the ITO film has to be reduced with a sufficient conductivity being maintained.

In general, ITO can be regarded as degenerate n-type indium oxide excessively doped with tin. Both of tin dopant and oxygen deficiency act as a donor which contributes to conductivity of ITO. For this reason, to mitigate oxygen deficiency to an intermediate level, an ITO film for use as a transparent electrode of a liquid crystal element is formed at a partial pressure higher than that at which a normal low-resistance ITO film is formed. Alternatively, the ITO film is made thin for increasing the transmittance.

For example, according to the first to third embodiments, to achieve a much higher transmittance as the transparent electrode 63, an ITO film having a thin thickness is formed on the transparent substrate 61 formed of a glass substrate. In this case, an ITO film having a film thickness in a range of 15 nanometers to 30 nanometers and a sheet resistance of 500 Ω/□ to 1000Ω/□ is formed through electron-beam vapor deposition.

It is assumed therein that, for example, an IT0 film having a thickness of 17 nanometers is formed so that the transmittance is equal to or higher than 90 percent (%), and the sheet resistance of this ITO film is 1000Ω/□. When light having a wavelength of 1550 nanometers enters this ITO film, a complex refractive index n~ of the IT0 film at this time is represented by the following equation (4) with n=0.56 and k=0.95 being substituted thereinto.

$$n\sim = n + ik \quad (4)$$

Here, n is an effective refractive index, k is an effective extinction coefficient, and i is an imaginary unit.

When such an ITO film is placed on a glass substrate having a refractive index n of 1.52 and then light enters the ITO film from the glass substrate side, a reflection on the order of 1/100 of the amount of incident light occurs at an interface between the ITO film and the glass substrate.

As shown in FIG. 6, in the variable optical attenuator according to any one of the first to third embodiments, the front substrate 105a of the liquid-crystal polarization rotator element 105 has a structure in which an ITO film (corresponding to the transparent electrode 63) is placed on the glass substrate as described above (corresponding to the transparent substrate 61). Therefore, such a reflection occurs between the glass substrate and the ITO film. As a result, optical loss occurs in the variable optical attenuator, which may become noise in an optical attenuation operation.

To get around this problem, according to the present embodiment, an ITiO film is formed on the transparent substrate 61 of the liquid-crystal polarization rotator element 105 in place of an ITO film to form the transparent electrode 63. The ITiO film is formed by doping indium oxide with titanium (Ti) in place of tin.

By using such an ITiO film, according to the present embodiment, conductivity similar to that in the case of using an ITO film can be ensured. Furthermore, the reflection at the interface between the transparent substrate 61 and the transparent electrode 63 on the front substrate 105a of the liquid-crystal polarization rotator element 105, that is, the reflection at the interface between the glass substrate and the ITiO film, can be suppressed.

For example, when an ITiO film having a thickness of 60 nanometers is formed so that the transmittance is equal to or larger than 90%, the birefringence ratio n~ of the film when light having a wavelength of 1550 nanometers enters the ITiO film is represented by equation (4) above with n=1.6 and k=0.02 being substituted thereinto. With the ITiO film, compared with the ITO film, reduction in extinction coefficient can be reduced. As a result, when an ITiO film is formed on the glass substrate, the refractive index at the interface between the glass substrate and the ITiO film can be reduced by the order of 1/1000.

Therefore, in the variable optical attenuator including the liquid-crystal polarization rotator element 105 that has the front substrate 105a with an ITiO film being formed as the transparent electrode 63 on the transparent substrate 61 made of a glass substrate, optical loss caused by the reflection mentioned above can be suppressed at the liquid-crystal polarization rotator element 105, thereby reducing noise. Also, the sheet resistance of the ITiO film is 250 Ω/□, and therefore an ITiO film having a low electron concentration and a high electron mobility can be achieved.

As described above, the ITiO film is an optimal film as a transparent conductive film forming the transparent electrode 63 of the liquid-crystal polarization rotator element 105 of the variable optical attenuator. With the use of this ITiO film, a variable optical attenuator having a further excellent characteristic can be achieved.

A variable optical attenuator according to a fifth embodiment of the present invention has a structure in which the liquid-crystal polarization rotator element 105 of the variable optical attenuator according to any one of the first to fourth embodiments includes a temperature adjusting unit. Other than that, the structure may take the structure of any one of the first to fourth embodiments. Therefore, the structure except for the liquid-crystal polarization rotator element 105 is not described herein.

Figure 16:
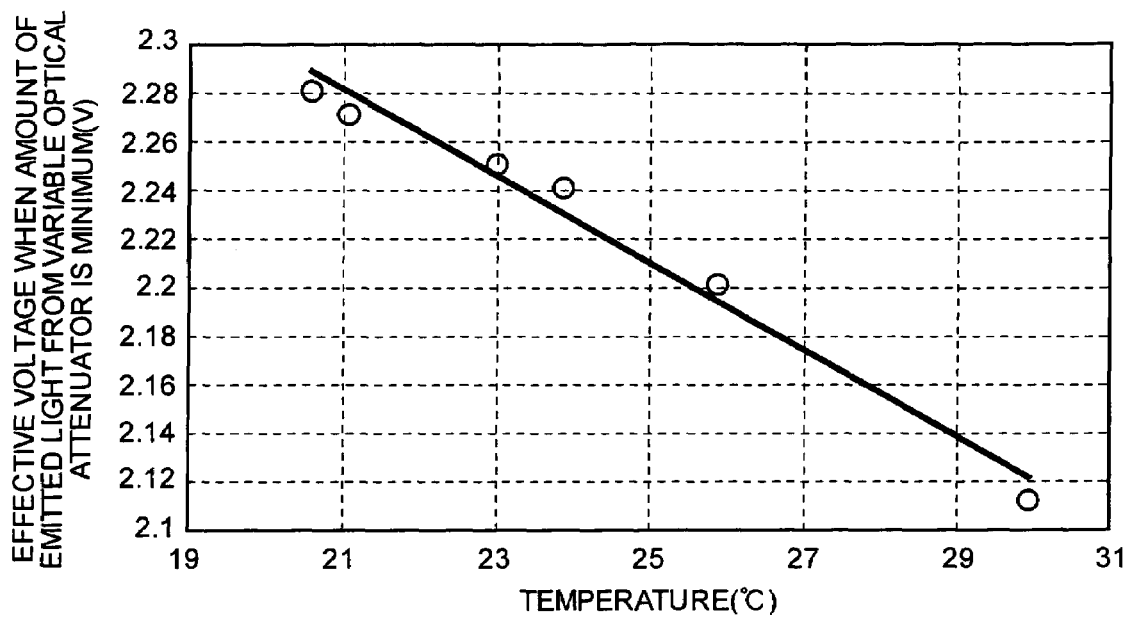
FIG. 16 is a graph of temperature dependency in a characteristic of the liquid-crystal polarization rotator element.

FIG. 16 is a graph of temperature dependency in the characteristic of the liquid-crystal polarization rotator element. Specifically, FIG. 16 is a graph of temperature dependency of a voltage applied to the liquid-crystal polarization rotator element when the liquid-crystal polarization rotator element is in a normally-off state, in other words, temperature dependency of a voltage applied to the liquid-crystal polarization rotator element when the amount of optical attenuation in the variable optical attenuator is at maximum.

Figure 17:
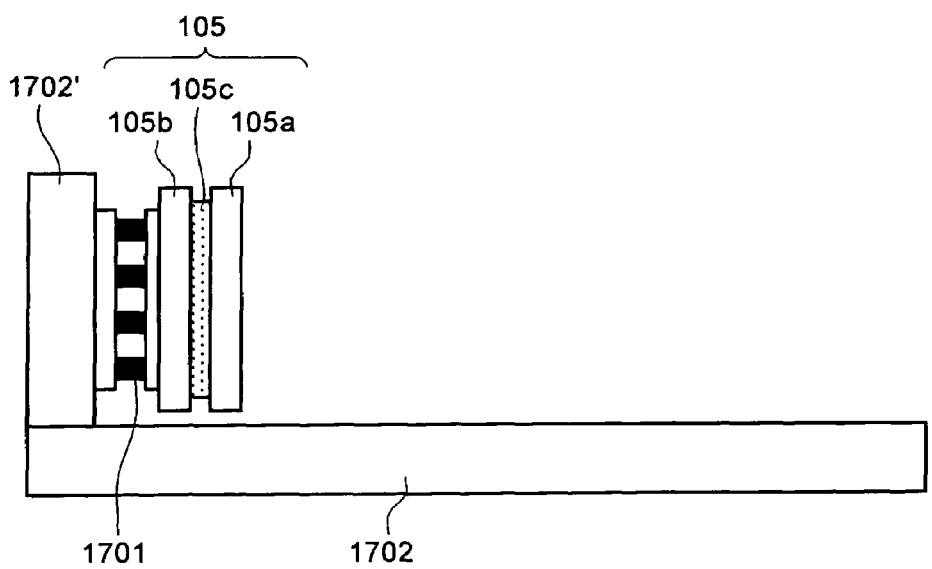
FIG. 17 is a schematic of a temperature adjusting mechanism of a liquid-crystal polarization rotator element in a variable optical attenuator according to a fifth embodiment of the present invention.

FIG. 17 is a schematic of the liquid-crystal polarization rotator element of the variable optical attenuator according to the present embodiment.

As shown in FIG. 17, in the variable optical attenuator according to the present embodiment, one surface of a Peltier element 1701, which is the temperature adjusting unit, is bonded onto the back surface side of the liquid-crystal polarization rotator element 105 (that is, the back surface side of the back substrate 105b). The other surface of the Peltier element 1701 is bonded onto a side plate 1702' of a supporting member 1702.

Particularly, in the liquid crystal molecules 105d forming the liquid crystal layer 105c of the liquid-crystal polarization rotator element 105 shown in FIG. 6, a response speed is delayed at low temperatures. Due to such changes in response speed, as shown in FIG. 16, the voltage applied to the liquid-crystal polarization rotator element 105 when the amount of optical attenuation is at maximum is changed according to temperature. Such temperature dependency of the applied voltage may cause the optical attenuation characteristic in the variable optical attenuator to deteriorate.

To get around this problem, in the present embodiment, the Peltier element 1701 (see FIG. 17) is used to keep the temperature of the liquid-crystal polarization rotator element 105 constant irrespectively of temperature changes in the external environment. With this, even if the temperature in the external environment is changed, a stable response speed can be achieved in the liquid crystal molecule 105d (see FIG. 6) of liquid-crystal polarization rotator element 105. Thus, temperature dependency of the voltage applied to the liquid-crystal polarization rotator element 105 as shown in FIG. 16 can be solved. For this reason, a stable optical attenuation characteristic is achievable in the variable optical attenuator.

In the above, the case in which the Peltier element 1701 is used as the temperature adjusting unit has been described. Alternatively, a temperature adjusting unit other than the Peltier element may be placed. For example, a heater may be used. When a heater is used, cost can be further reduced compared to the case of using a Peltier element.

In a method of driving the variable optical attenuator according to a sixth embodiment of the present invention, a pulse width modulation (PWM) scheme is applied. In the variable optical attenuator driven by the PWM scheme, a driving circuit (specifically, a CMOS circuit) of the liquid-crystal polarization rotator element 105 can be downsized, and also an easy driving control is possible. Furthermore, a multi-tone driving circuit can be formed exclusively with digital circuits. As such, by driving the variable optical attenuator through the PWM scheme, an advantageous effect is attained compared with the case of driving through a pulse height modulation (PHM) scheme requiring an analog circuit.

Figure 18:
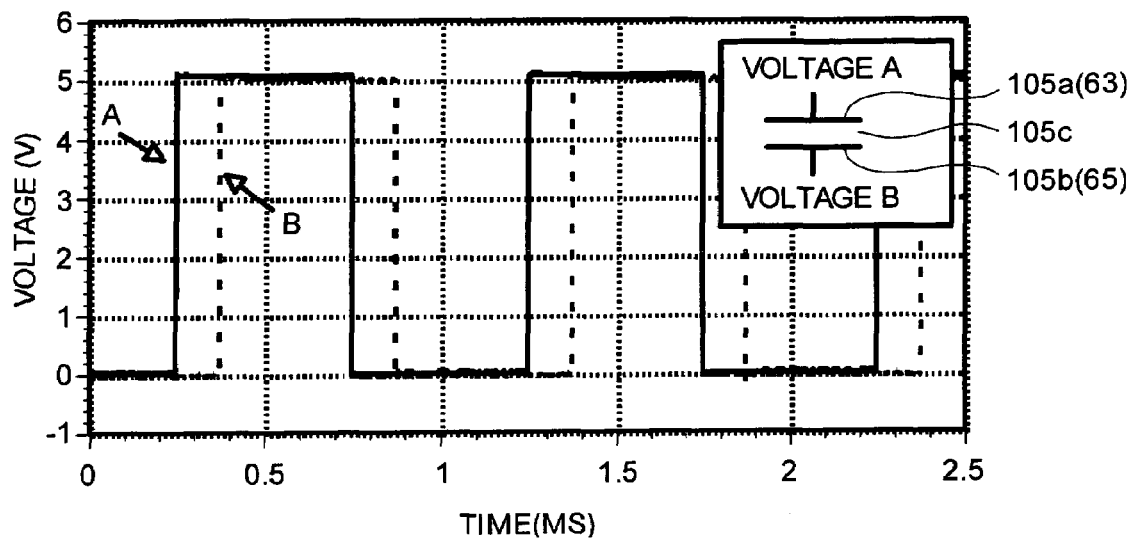
FIG. 18 is a schematic for explaining a voltage applying scheme in a method of driving a variable optical attenuator according to a sixth embodiment of the present invention.

The method of driving the variable optical attenuator through the PWM scheme is specifically described with reference to FIGS. 18 to 20. FIG. 18 is a schematic of waveforms of voltages applied to the transparent electrode 63 of the front substrate 105a and the reflecting electrode 65 of the back substrate 105b in the liquid-crystal polarization rotator element 105 shown in FIG. 6. A solid-line waveform A shown in FIG. 18 represents a voltage applied to the transparent electrode 63, and a dotted-line waveform B shown in FIG. 18 represents a voltage to the reflecting electrode 65. The vertical axis represents the magnitude of the applied voltage, and the horizontal axis represents time.

As shown in FIG. 18, a voltage of 5 volts (V) is applied to the transparent electrode 63 of the liquid-crystal polarization rotator element 105 at predetermined cycles for a predetermined period of time, and has a waveform of a rectangular pulse (refer to the solid-line waveform A in the drawing). On the other hand, a voltage of 5 V is applied to the reflecting electrode 65 at the same cycle as that for the transparent electrode 63 with a timing being shifted from the timing of applying the voltage to the transparent electrode 63 (refer to the dotted-line waveform B in FIG. 18). Therefore, the voltage waveform B of the voltage applied to the reflecting electrode 65 has a waveform of a rectangular pulse similar to that of the voltage waveform A for the transparent electrode 63. Also, phases of both of the voltage waveforms are shifted from each other, thereby causing a phase difference.

Here, such application of the voltage to the transparent electrode 63 and the reflecting electrode 65 is controlled by, for example, the CMOS circuit.

Figure 19:
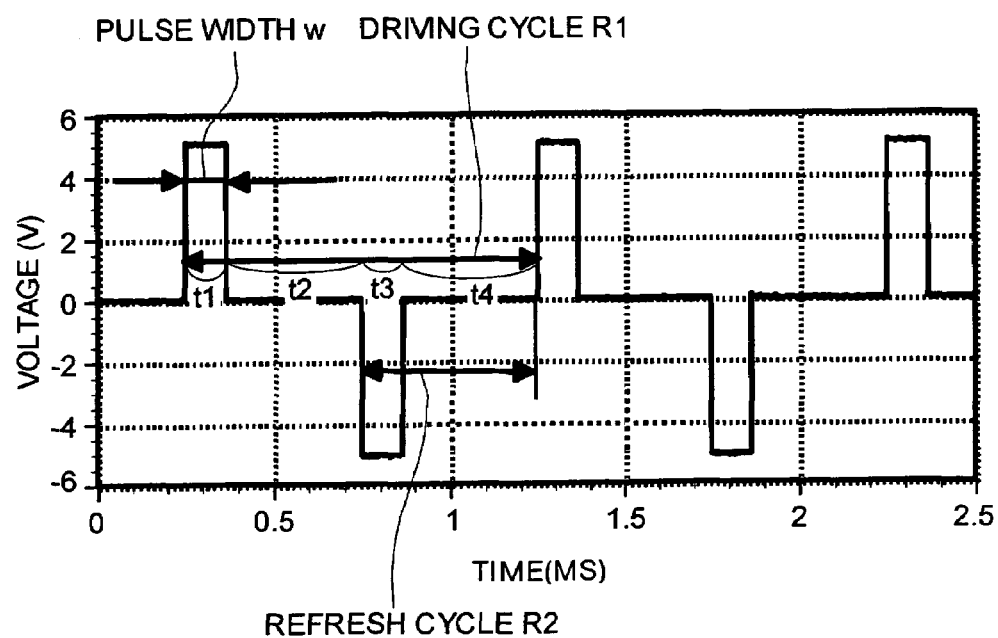
FIG. 19 is a schematic for explaining an effective voltage to be applied to a liquid-crystal layer of the liquid-crystal polarization rotator element by the voltage applying scheme.

FIG. 19 is a schematic of a waveform of an effective voltage applied to the liquid crystal layer 105c (see a box shown in FIG. 18) by the voltage application to the transparent electrode 63 and the reflecting electrode 65 shown in FIG. 18. The vertical axis shown in FIG. 18 represents a magnitude of the effective voltage, and the horizontal axis shown in FIG. 18 represents time.

As shown in FIG. 19, in the liquid-crystal polarization rotator element 105, a difference between the voltages applied to the transparent electrode 63 and the reflecting electrode 65 (see the box shown in FIG. 18 for both electrodes) represents an effective voltage to be applied to the liquid crystal layer 105c (see the box shown in FIG. 18). Therefore, the effective voltage has a waveform of a rectangular pulse, and a phase difference between the voltage waveforms A and B of both of the electrodes 63 and 65 (see FIG. 18) represents a pulse width W of the effective voltage waveform.

Specifically, it is assumed herein that a value obtained by subtracting the voltage applied to the reflecting electrode 65 from the voltage applied to the transparent electrode 63 is taken as an effective voltage for the liquid crystal layer 105c (see FIG. 6). The effective voltage is positive when the voltage applied to the transparent electrode 63 is higher than the voltage applied to the reflecting electrode 65, and the effective voltage is negative when the voltage applied to the reflecting electrode 65 is higher than the voltage applied to the transparent electrode 63.

Also, the cycle of the effective voltage, that is, a driving cycle R1 of the liquid-crystal polarization rotator element 105 coincides with a voltage waveform cycle of the voltage applied to the transparent electrode 63. Here, a half cycle of this driving cycle R1 is defined as a refresh cycle R2.

As such, according to the present embodiment, in the variable optical attenuator, the timing of application of a voltage to the transparent electrode 63 and the reflecting electrode 65 of the liquid-crystal polarization rotator element 105 is adjusted as shown in FIG. 18, thereby making it possible to adjust the pulse width of the effective voltage applied to the liquid crystal layer 105*c*. With this, a driving control through a PMW scheme is attained.

Figure 20:
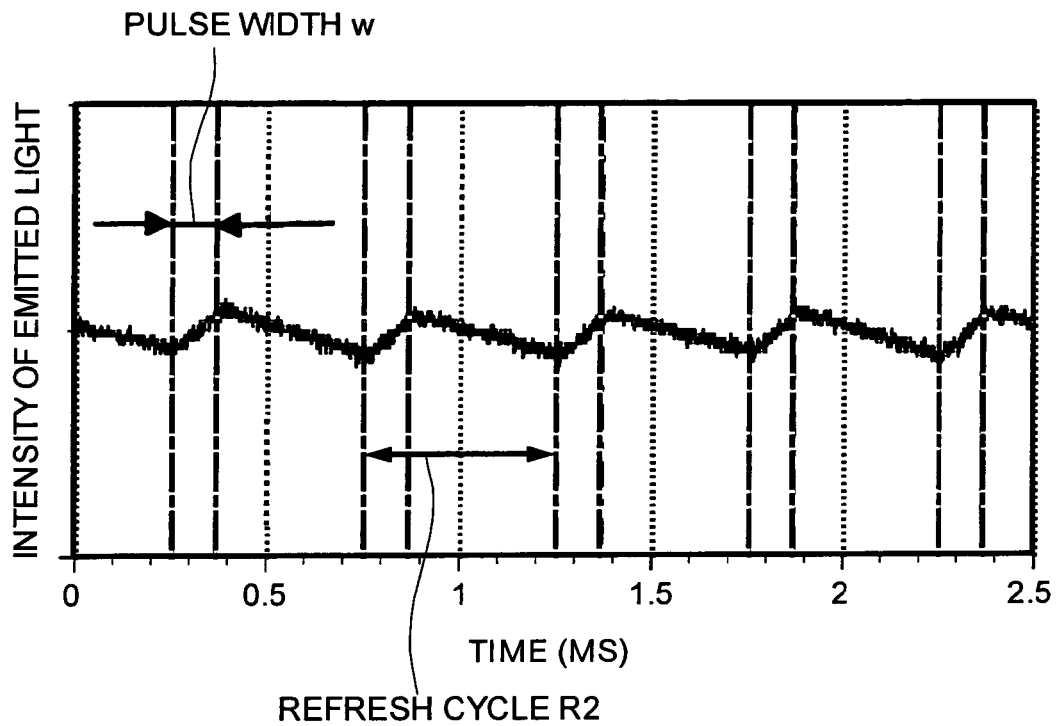
FIG. 20 is a schematic of intensity variations of emission light in the variable optical attenuator that is driven by the effective voltage.

FIG. 20 is a schematic of intensity variations of light emitted from the variable optical attenuator when the effective voltage is applied in the manner as shown in FIG. 19. Here, the vertical axis represents relative intensity of light emitted from the variable optical attenuator, and the horizontal axis represents time.

As shown in FIG. 20, when the effective voltage is applied (that is, during periods t1 and t3 in FIG. 19), as described above, rotation of the polarizing direction is suppressed at the liquid-crystal polarization rotator element 105 thereby suppressing optical attenuation. Therefore, the intensity of the light emitted from the variable optical attenuator is increased.

On the other hand, when no effective voltage is applied (that is, during periods t2 and t4 in FIG. 19), as described above, the polarizing direction is rotated at the liquid-crystal polarization rotator element 105, thereby increasing optical attenuation. Therefore, the intensity of the emitted light is decreased.

Thus, the intensity of the light emitted from the variable optical attenuator cyclically changes according to the driving cycle R1 (see FIG. 19) of the effective voltage. In such changes in emitted light intensity, one cycle is equal to the refresh cycle described above.

Here, when the liquid crystal layer 105*c* (refer to the box in FIG. 18) of the liquid-crystal polarization rotator element 105 is made of nematic liquid crystal having a low response speed, the liquid crystal operates in response to the effective value of the voltage waveform. However, when the liquid crystal layer 105*c* is made of nematic liquid crystal having a high response speed, the liquid crystal tries to operate in response to the pulse waveform itself. This is due to the fact that the response time of the liquid crystal is shorter than the refresh cycle R2 (in other words, a pulse-train interval).

As a result of such a pulse waveform response, the intensity of the emitted light exhibits an optical response influenced by the pulse waveform, thereby causing a "waveform response" phenomenon. Specifically, the intensity of the emitted light is not only changed according to the driving cycle R1 (see FIG. 19), but also, as shown in FIG. 20, always fluctuated to cause flickers. Such occurrence of flickers is not preferable when the variable optical attenuator is used for optical communications.

To get around this problem, according to the present embodiment, for the purpose of suppressing the occurrence of such flickers, a refresh frequency having a length that does not cause a pulse waveform response of the liquid crystal is set. Specifically, for example, when MJ011580 (Merck Ltd., Japan) is used as the nematic liquid crystal, a critical refresh frequency that does not cause a waveform response is determined at 40 kilohertz, and the frequency is set so as to be below this critical refresh frequency. This can suppress the occurrence of flicker, thereby achieving an excellent optical attenuation characteristic in the variable optical attenuator.

Here, the case in which an effective voltage of 5 V is applied has been described. The effective voltage is not meant to be restricted to the above, and is appropriately set in consideration of an influence the driving scheme may have on an electrical-optical response of the liquid crystal. Also, the driving cycle of the effective voltage is not meant to be restricted to the above.

Figure 21:
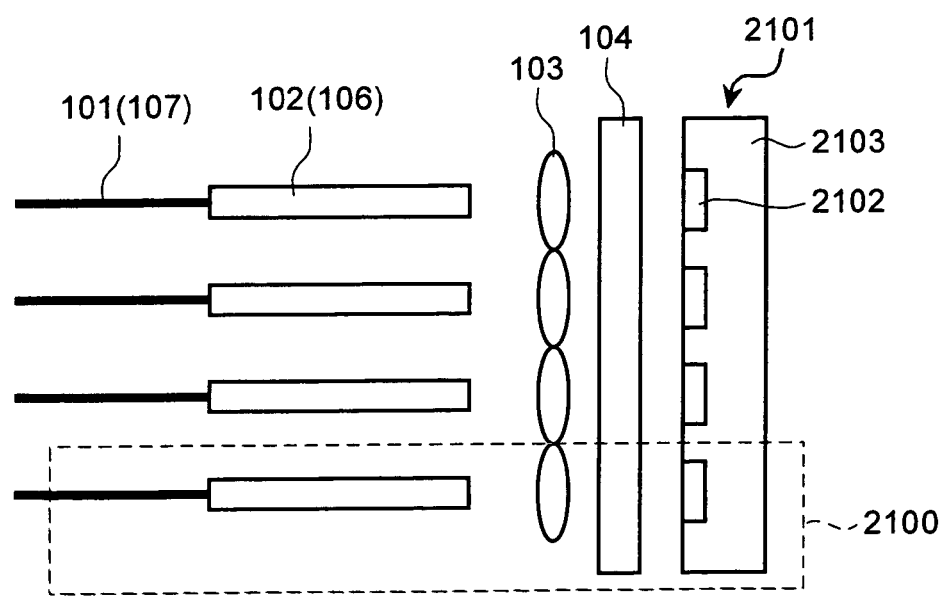
FIG. 21 is a plan view of a multichannel variable optical attenuator according to a seventh embodiment of the present invention.
Figure 22:
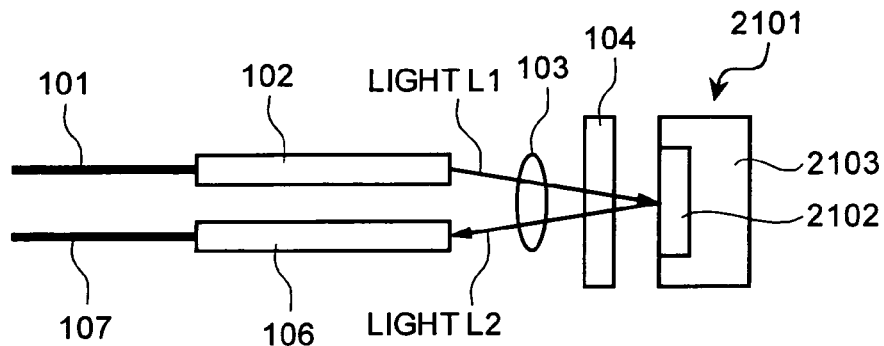
FIG. 22 is a side view of the variable optical attenuator shown in FIG. 21.
Figure 23:
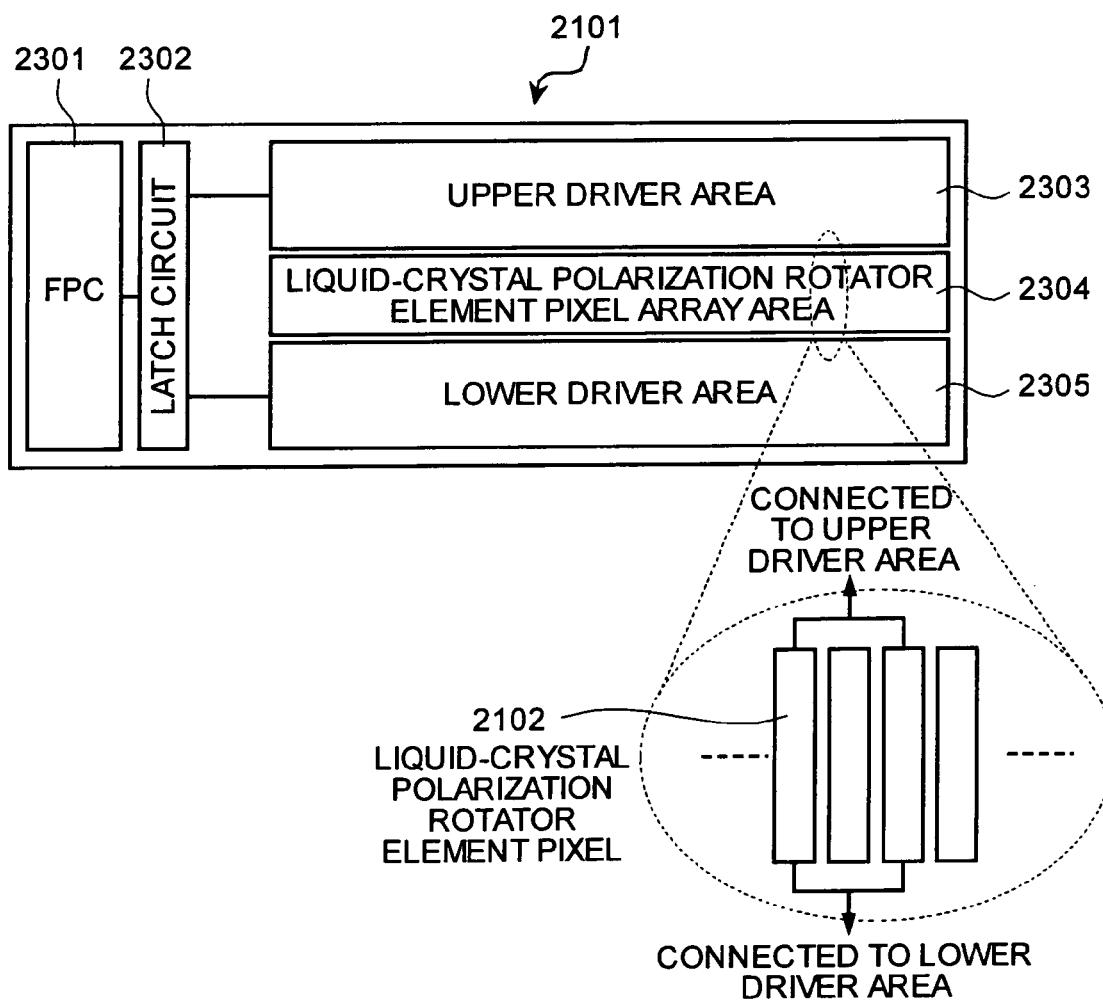
FIG. 23 is a schematic of arrayed liquid-crystal polarization rotator elements in the variable optical attenuator shown in FIGS. 21 and 22.

FIGS. 21 and 22 depict a structure of a variable optical attenuator according to a seventh embodiment of the present invention. FIG. 21 is a plan view of the variable optical attenuator and FIG. 22 is a side view thereof. FIG. 23 is a schematic of arrayed liquid-crystal polarization rotator elements shown in FIGS. 21 and 22.

As shown in FIGS. 21 and 22, the variable optical attenuator according to the present embodiment is implemented by a plurality of variable optical attenuator units 2100 each having the structure according to the first embodiment shown in FIG. 1, these units being integrally arrayed. Here, the variable optical attenuator unit 2100 may have the structure of any one of the second to sixth embodiments excluding that of the first embodiment as a basic structure.

In this structure, each variable optical attenuator unit 2100 forms one channel in an optical attenuation operation. Therefore, according to the present embodiment, a multichannel variable optical attenuator is achieved. Although a four-channel variable optical attenuator having four variable optical attenuator units 2100 is shown in the drawing, the number of channels is not meant to be restricted to the above. As shown in FIG. 23, which will be described further below, the variable optical attenuator for use in optical communications often has an extremely large number of channels.

In the multichannel variable optical attenuator having the structure described above, the variable optical attenuator unit 2100 includes, as described in the first embodiment, the incident-side optical fiber 101 having an end at which the fiber collimator 102 is placed, the emission-side optical fiber 107 having an end at which the fiber collimator 106 is placed, the lens 103, and the Savart plate 104.

Here, as shown in FIG. 21, the incident-side optical fiber 101 and the emission-side optical fiber 107 are arranged so as to be overlap with each other when viewed from front. Also, the Savart plate 104 is commonly shared by the variable optical attenuator units 2100.

In the above description, an angle formed by an incident plane formed by the incident light L1 and the emitted light L2 at the Savart plate 104 side of the lens 103 and a plane formed by two optical axes in the Savart plate 104 has not been specifically mentioned. However, if the incident angle of the light L1 is large, the incident plane and the plane formed by two optical axes are preferably orthogonal to each other because the difference in optical path occurring between the p-polarized light beam 31 and the s-polarized light beam 32 due to tilted entering can be reduced.

Also, the variable optical attenuator according to the present embodiment includes an arrayed liquid-crystal polarization rotator element 2101 commonly provided for the variable optical attenuator units 2100. The arrayed liquid-crystal polarization rotator element 2101 has a structure in which a plurality of liquid-crystal polarization rotator element pixels 2102 are arrayed on the same Si integrated substrate 2103. The liquid-crystal polarization rotator element pixels 2102 and the variable optical attenuator units 2100 are placed so as to have a one-to-one correspondence. That is, the structure is such that the liquid-crystal polarization rotator elements of the variable optical attenuator for each channel are integrated.

As shown in FIG. 23, in an arrayed liquid-crystal polarization rotator element 2101, liquid-crystal polarization rotator element pixels 2102 each having the structure of FIG. 6 are one-dimensionally arranged and arrayed on a Si integrated substrate 2103 having a circuit, such as a CMOS circuit, with the Si integrated substrate 2103 serving as the back substrate 105b commonly shared.

Specifically, on the Si integrated circuit 2103, a flexible print circuit (FPC) 2301, a latch circuit 2302, an upper driver area 2303 having a driving circuit (not shown), and a lower driver area 2305. Between the upper and lower driver areas 2303 and 2305 are the liquid-crystal polarization rotator element pixels 2102 arrayed one-dimensionally (in a row in the horizontal direction) to form a liquid-crystal polarization rotator element pixel array area 2304.

Although not shown, on the Si integrated circuit 2103, a connection pad for connection to the flexible print circuit 2301 and wirings for connection are provided.

Also, for example, the upper and lower driver areas 2303 and 2305 each include a driving circuit (not shown) that can achieve 12-bit tone through a PWM scheme. With the driving circuits, the CMOS circuits (not shown) of the liquid-crystal polarization rotator element pixels 2102 are separately controlled. Thus, the voltages applied to the liquid-crystal polarization rotator element pixels 2102 can be separately controlled.

As shown in a partial enlarged view shown in FIG. 23, for example, in the liquid-crystal polarization rotator element pixel array area 2304, liquid-crystal polarization rotator element pixels 2102 each having 380 μm in height×23.8 μm in width are arranged with a pitch of 1.2 μm. A cell gap in the liquid-crystal polarization rotator element pixels 2102 is 5 μm. To widen a pitch between the driving circuits (not shown) of the upper and lower driver areas 2303 and 2305, the liquid-crystal polarization rotator element pixels 2102 are connected to the upper and lower driving circuits alternately for each adjacent pixel.

In the arrayed liquid-crystal polarization rotator element 2101 having the structure described above, one liquid-crystal polarization rotator element pixel 2102 corresponds to one channel of the variable optical attenuator. Therefore, in the arrayed liquid-crystal polarization rotator element 2101 having 512 pixels, 512 channels can be achieved.

In the arrayed liquid-crystal polarization rotator element 2101 described above, the liquid-crystal polarization rotator element pixel array area 2304 and the upper and lower driver areas 2303 and 2305 are separated from each other. Therefore, the liquid-crystal polarization rotator element pixel array area 2304 does not have to be planarized. In a normal arrayed liquid-crystal polarization rotator element 2101 where the liquid-crystal polarization rotator element pixels 2102 are arranged in a matrix, each liquid-crystal polarization rotator element pixel 2102 is formed on the driving circuit of the driver area, and therefore a process of planarizing the liquid-crystal polarization rotator element pixel array area 2304 is essential. By contrast, in the structure according to the present embodiment, such a planarizing process is not required, thereby simplifying a manufacturing process. As a result, a small-sized, multichannel arrayed liquid-crystal polarization rotator element 2101 can be manufactured through a simple process.

In the multichannel variable optical attenuator including the arrayed liquid-crystal polarization rotator element 2101, with the operation of each variable optical attenuator unit 2100, the optical attenuation operation described in the first embodiment is performed independently for each channel. With this, an effect similar to that according to the first embodiment is achieved in each channel.

From the above, according to the variable optical attenuator of the present embodiment, reduction in PDL and PMD is achieved in each channel, thereby making it possible to attain a small-sized, multichannel variable optical attenuator that is easy to manufacture.

In the above, as shown in FIG. 21, the case in which the channels of the variable optical attenuator and the liquid-crystal polarization rotator element pixels 2102 have a one-to-one correspondence has been described. Alternatively, as an example of modification of the present embodiment, the channels and the liquid-crystal polarization rotator element pixels 2102 may not have a one-to-one correspondence. Specifically, one channel may include a plurality of liquid-crystal polarization rotator element pixels 2102, or a plurality of channels may include a single one of the liquid-crystal polarization rotator element pixels 2102.

For example, in a multichannel variable optical attenuator for use in a gain equalizer, to reduce ripples occurring in an optical characteristic due to a space among the liquid-crystal polarization rotator element pixels 2102 (see FIG. 21), one channel include a plurality of liquid-crystal polarization rotator element pixels 2102. In this case, in the variable optical attenuator unit 2100 forming one channel (see FIG. 21), the number of placement of incident-side and emission-side optical fibers 101 and 107 (see FIG. 21) is different from the number of placement of the liquid-crystal polarization rotator element pixels 2102 in the arrayed liquid-crystal polarization rotator element 2101 (see FIG. 21). Such a structure is achieved by placing an optical element, such as a prism, as appropriate between the incident-side and emission-side optical fibers 101 and 107 and the arrayed liquid-crystal polarization rotator element 2101.

In an eighth embodiment according to the present invention, a tunable filter of a free-space optical system including the multichannel variable optical attenuator according to the seventh embodiment is described. Here, a tunable filter for use in a wavelength division multiplexing (WDM) system is described.

Figure 24:
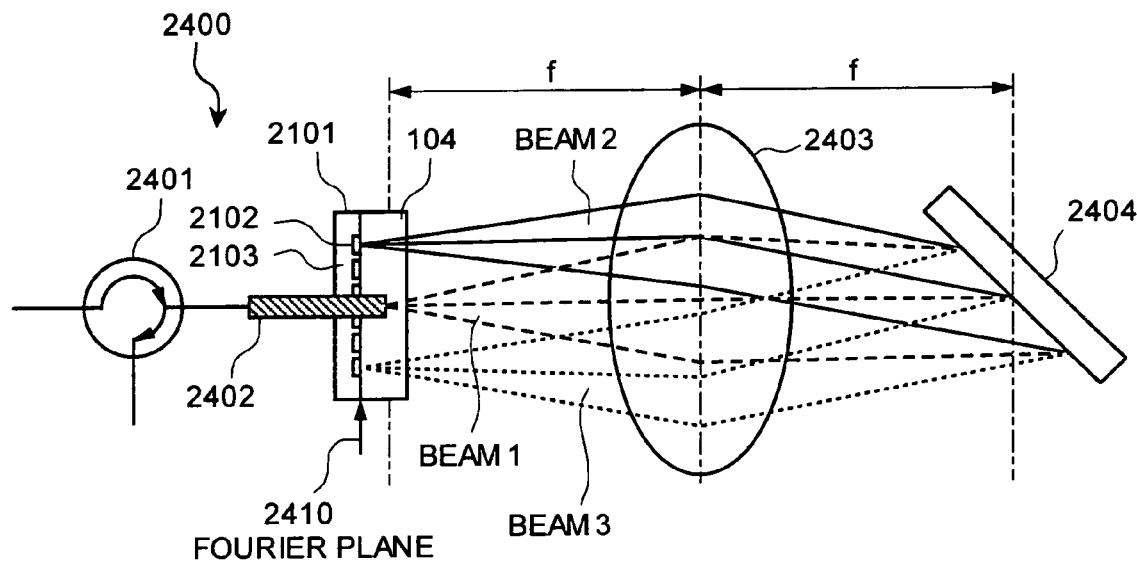
FIG. 24 is a schematic of a tunable filter according to an eighth embodiment of the present invention.

FIG. 24 is a schematic of the structure of the tunable filter according to the eighth embodiment of the present invention. As shown in FIG. 24, the tunable filter according to the present embodiment includes a variable optical attenuator 2400, a compound lens 2403, and a spectroscope 2404. The variable optical attenuator 2400 includes the arrayed liquid-crystal polarization rotator element 2101 forming the structure described above in the seventh embodiment, the Savart plate 104, and an optical fiber for incident and emitted light 2402 that is connected to an optical circulator 2401.

Here, each of the liquid-crystal polarization rotator element pixels 2102 forming the arrayed liquid-crystal polarization rotator element 2101 forms on channel of the variable optical attenuator 2400. At each channel, an attenuation operation for the light for each wavelength is performed. Also, the single optical fiber for incident and emitted light 2402 and the single Savart plate 104 are shared in common among the channels. The variable optical attenuator 2400 having the structure described above is placed on a Fourier plane 2410 of an optical system of the tunable filter.

In the tunable filter having the structure described above, wavelength-multiplexed light (beam 1) entering the optical fiber for incident and emitted light 2402 of the variable optical attenuator 2400 is emitted toward the compound lens 2403 from an end of the optical fiber for incident and emitted light 2402. Here, as the compound lens 2403, a Littrow lens is used.

Also, for convenience of description of optical behaviors in the tunable filter, the optical fiber for incident and emitted light 2402 is embedded in the arrayed liquid-crystal polarization rotator element 2101 and the Savart plate 104 of the variable optical attenuator 2400. In practice, however, the optical fiber for incident and emitted light 2402 is spaced apart from the arrayed liquid-crystal polarization rotator element 2101 and the Savart plate 104.

Therefore, when the light (beam 1) is emitted from the optical fiber for incident and emitted light 2402 toward the compound lens 2403 and when the light (beam 1) enters the optical fiber for incident and emitted light 2402 from the compound lens 2403, the light (beam 1) proceeds along an optical path not via the Savart plate 104. Also, at the time of entrance and emission of light beams (beams 2 and 3) in the arrayed liquid-crystal polarization rotator element 2101, which will be described further below, the optical fiber for incident and emitted light 2402 does not hinder the light beams (beams 2 and 3).

The light (beam 1) passing through the compound lens 2403 enters the spectroscope 2404, where the light is separated by wavelength and reflected. The light beams (beams 2 and 3) obtained through separation by wavelength again enter the compound lens 2403 and then the variable optical attenuator 2400. At the variable optical attenuator 2400, each of the light beams (beams 2 and 3) for the relevant wavelength enters the arrayed liquid-crystal polarization rotator element 2101 via the Savart plate 104, and is then reflected on the liquid-crystal polarization rotator element pixel 2102 corresponding to the relevant wavelength.

Each of the light beams (beams 2 and 3) reflected on the relevant liquid-crystal polarization rotator element pixel 2102 of the arrayed liquid-crystal polarization rotator element 2101 again passes through the Savart plate 104 and is then emitted to the compound lens 2403. Then, each of the light beams (beams 2 and 3) passing through the compound lens 2403 again enters the spectroscope 2404, where the light is reflected. The reflected light (beam 1) again enters the optical fiber for incident and emitted light 2402 via the compound lens 2403. As such, in the tunable filter according to the present embodiment, a 4f-telecentric optical system is achieved.

Here, the arrayed liquid-crystal polarization rotator element 2101 of the variable optical attenuator 2400, the state of liquid crystal alignment of the liquid-crystal polarization rotator element pixels 2102 is controlled for each channel. With this control, rotation of the polarizing direction of each of the light beams (beams 2 and 3) distributed for each channel is controlled for each channel.

Therefore, as has been described in the first embodiment, in the arrayed liquid-crystal polarization rotator element 2101, for example, the emitted light (beam 1) from the channel where the state of alignment of the liquid crystal is controlled to a state shown in FIG. 6 with the polarizing direction being rotated by 90 degrees proceeds along an optical path different from that when first entering. Therefore, the emitted light cannot again enter the optical fiber for incident and emitted light 2402. On the other hand, the emitted light (beam 1) from the channel where the state of alignment of the liquid crystal is controlled to a state shown in FIG. 8 with the polarizing direction not being rotated proceeds along the same optical path as that when first entering. Therefore, the emitted light enters the optical fiber for incident and emitted light 2402 with the same amount of light as that when first entering.

As such, in the structure described above, the state of alignment of the liquid crystal in the liquid-crystal polarization rotator element pixels 2102 is controlled for each channel, thereby making it possible to adjust, as appropriate, the amount of light entering the optical fiber for incident and emitted light 2402 for each channel (that is, for each light beam obtained through wavelength separation).

The light (beam 1) entering the optical fiber for incident and emitted light 2402 is emitted via the optical fiber for incident and emitted light 2402. At this time, in the optical fiber for incident and emitted light 2402, the incident light and the emitted light are separated from each other by the optical circulator 2401.

As such, in the tunable filter according to the present embodiment, the light beams (beams 2 and 3) of different wavelength distributed to the respective channel of the variable optical attenuator 2400 can be attenuated separately for each wavelength. Therefore, wavelength-multiplexed light entering the tunable filter can be separated at a desired intensity for each wavelength.

Figure 25:
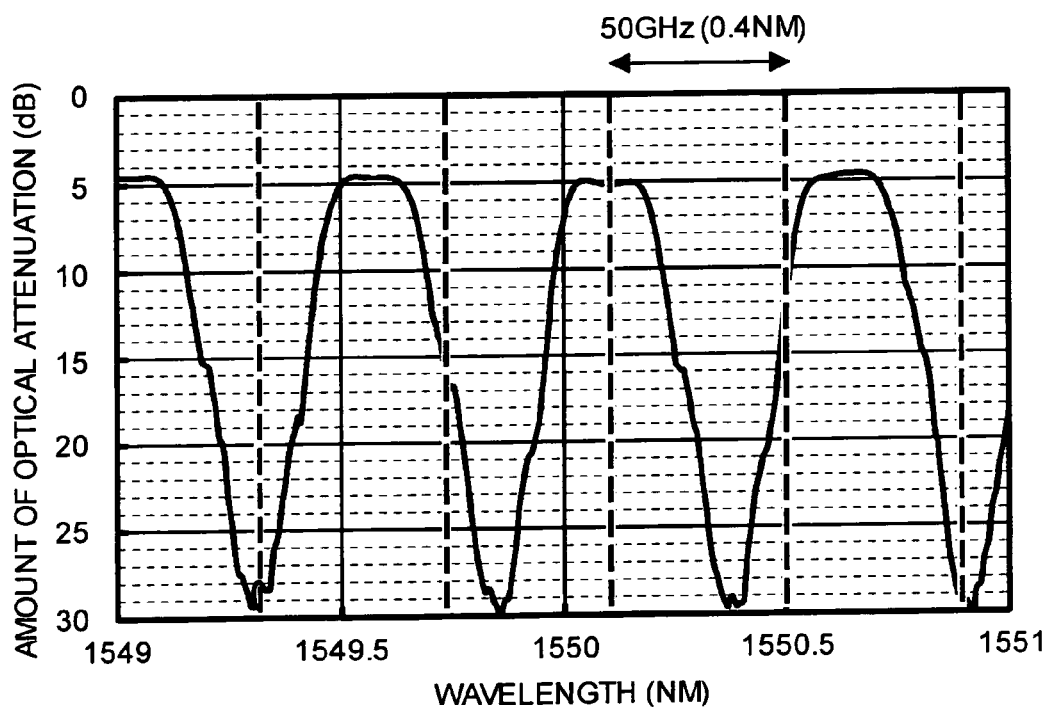
FIG. 25 is a characteristic plot of the tunable filter shown in FIG. 24.

FIG. 25 is a drawing of a characteristic of the tunable filter according to the present embodiment, wherein either one or both of ON and OFF are sequentially performed for each channel.

In this case, as has been described in the first embodiment, in the variable optical attenuator 2400, an excellent characteristic in optical attenuation for each wavelength for each channel is achieved. Therefore, the wavelength-multiplexed light can be easily separated with such an excellent characteristic. Also, as described above, the variable optical attenuator 2400 is downsized. Therefore, a small-sized tunable filter having a simplified structure can be achieved.

Figure 26:
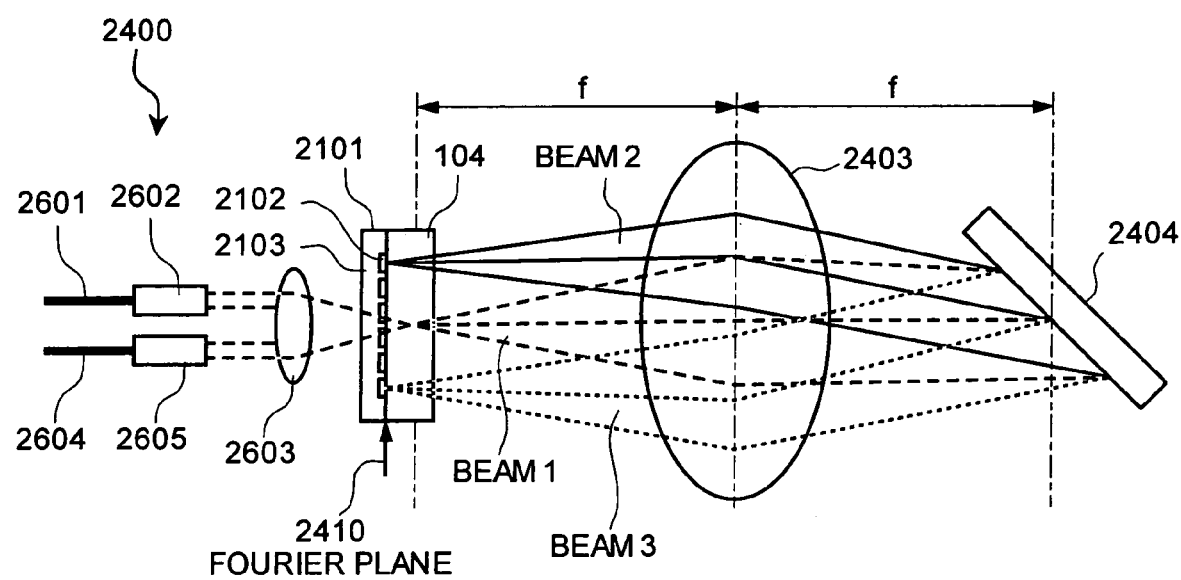
FIG. 26 is a schematic of a tunable filter according to a ninth embodiment of the present invention.

FIG. 26 is a schematic of a tunable filter according to a ninth embodiment of the present invention. As shown in FIG. 26, the tunable filter according to the present embodiment has a structure similar to that in the eighth embodiment, but the structure of the light input and output unit is different from that in the eighth embodiment.

Specifically, according to the eighth embodiment, the optical circulator 2401 and the single optical fiber for incident and emitted light 2402 (see FIG. 24 for both) form the light input and output unit. By contrast, according to the present embodiment, an incident-side optical fiber 2601 having an end at which a fiber collimator 2602 is placed, an emission-side optical fiber 2604 having an end at which a fiber collimator 2605 is placed, and a relay lens 2603 form the light input and output unit. That is, according to the present embodiment, a light inputting unit and a light outputting unit are separately provided in the tunable filter.

Also in the present embodiment having the structure described above, an effect similar to the effect described in the eighth embodiment is achieved.

In the above description, an angle formed by an incident plane formed by the incident light L1 and the emitted light L2 at the Savart plate 104 side of the relay lens 2603 and a plane formed by two optical axes in the Savart plate 104 has not been specifically mentioned. However, if the incident angle of the light L1 is large, the incident plane and the plane formed by two optical axes are preferably orthogonal to each other because the difference in optical path length occurring between the p-polarized light beam 31 and the s-polarized light beam 32 due to tilted entering can be reduced.

Furthermore, in the eighth and ninth embodiments, the case in which the variable optical attenuator according to the present invention is applied to a tunable filter has been described. Alternatively, the variable optical attenuator according to the present invention can be applied for another purpose, such as a blocking filter.

Figure 27A:
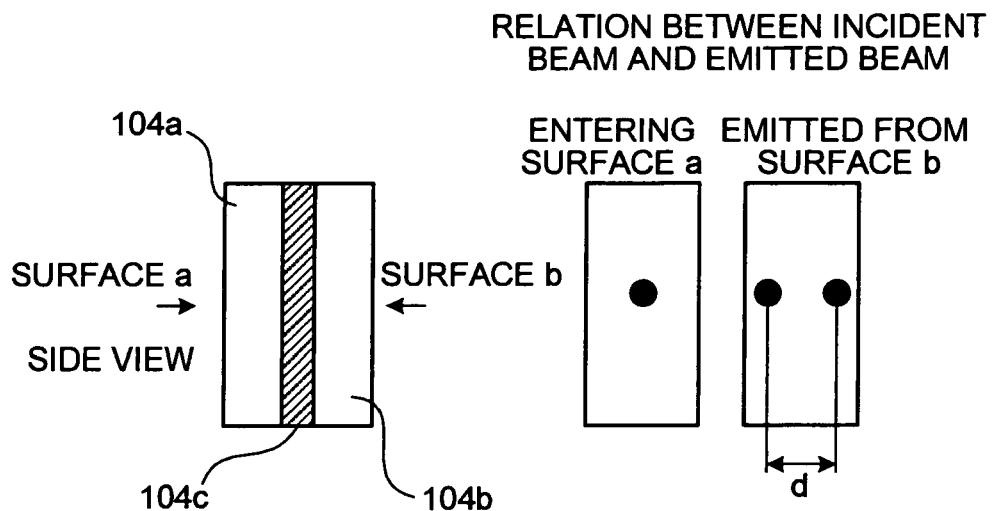
FIGS. 27A to 27C are schematics for explaining an effect of a Savart plate (modified Savart plate) according to a tenth embodiment of the present invention.
Figure 27B:
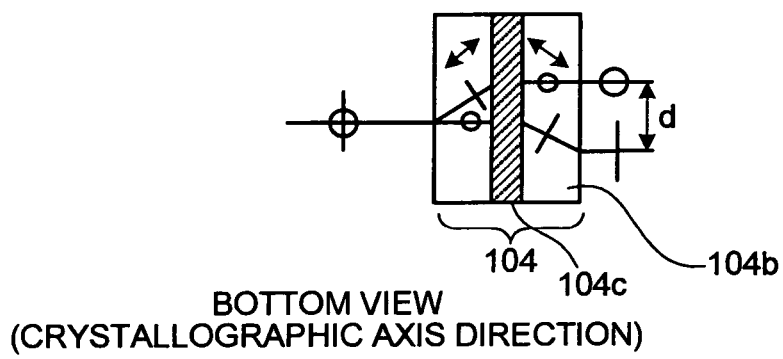
Figure 27C:
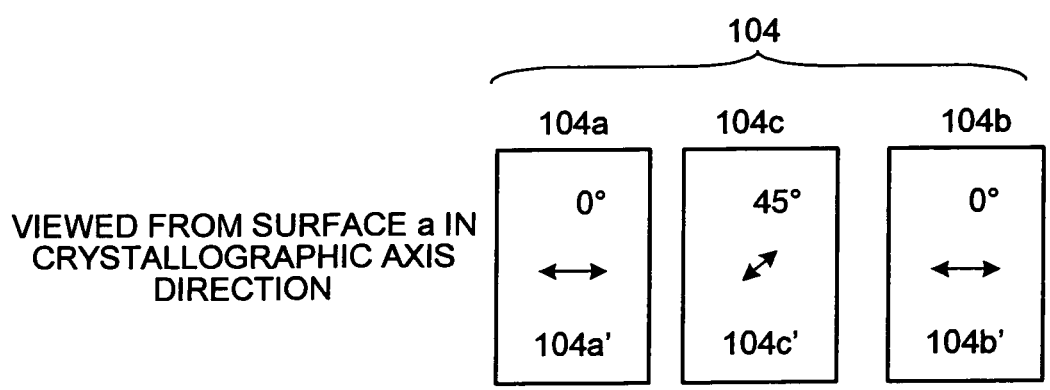
Figure 28:
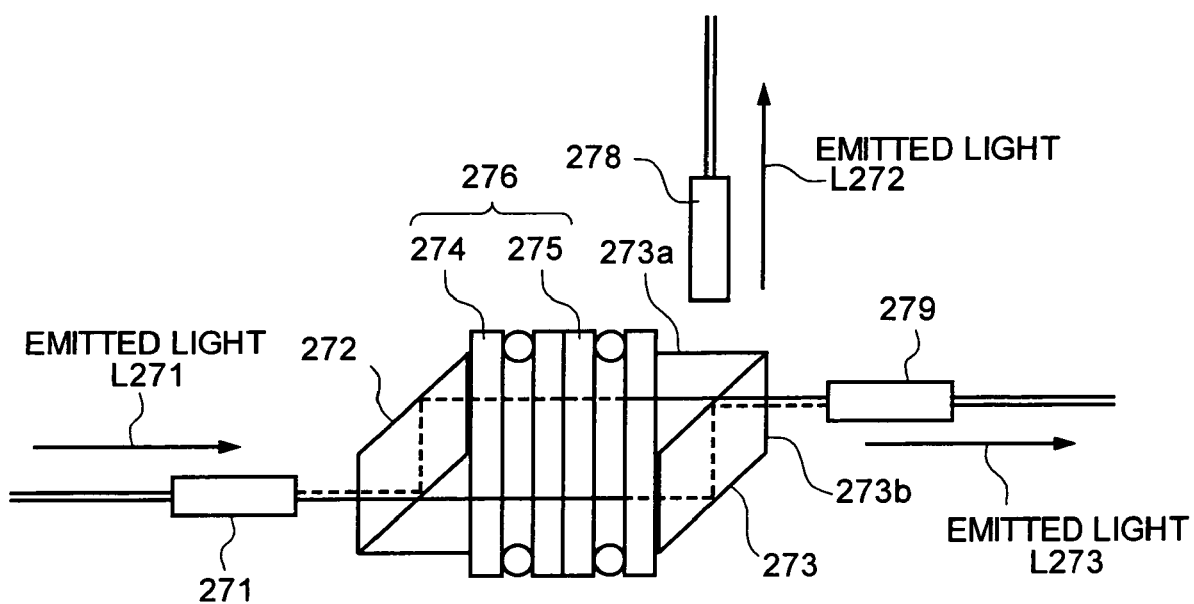
FIG. 28 is a schematic of a conventional liquid-crystal variable optical attenuator.

Next, a tenth embodiment according to the present invention is described. FIG. 27A includes a side view of a modified Savart plate of the variable optical attenuator shown in FIG. 1 and a schematic, viewed from the side view, of a beam position on a surface a at an incident beam side and a beam position on a surface b at emitted beam side. FIG. 27B is a schematic of the progress of an incident beam when the modified Savart plate in FIG. 27A is viewed from the bottom surface side. FIG. 27C is a schematic of a crystallographic axis direction of the birefringent plates and a ½ wave plate forming the modified Savart plate viewed from the surface a in FIG. 27A.

The tenth embodiment is different from the first embodiment in the structure of the Savart plate 104. The Savart plate 104 according to the first embodiment is a birefringent plate with two birefringent plates 104a and 104b being laminated together. By contrast, the Savart plate (modified Savart plate) 104 according to the tenth embodiment is a birefringent plate with two birefringent plates 104a and 104b being laminated via a ½ wave plate made of crystal, as shown in FIG. 27A. The birefringent plates 104a and 104b are both made of rutile ($TiO_2$), which is an anisotropic material.

Also, as shown in FIG. 27C, the components forming the birefringent plate are laminated so that projection components on the optical axis 104a' of the birefringent plate 104a and projection components on the optical axis 104b' of the birefringent plate 104b are parallel to each other and an optical axis 104c' of the ½ wave plate forms an angle of 45 degrees with respect to each of the optical axes 104a' and 104b'.

With this structure, as shown in FIG. 27A, the light L1 (see FIG. 1) enters the birefringent plate 104a at a position denoted by a black dot on the drawing of "entering the surface a", and is then emitted from the birefringent plate 104b at positions denoted by black dots on the drawing of "emitted from the surface b. Here, the light L1 having two polarizing components proceeds along different courses depending on the polarizing components, which is shown in FIG. 27B.

Here, the modified Savart plate 104 and the liquid-crystal polarization rotator element 105 are placed so that the optical axes 104a' and 104b' of the birefringent plates 104a and 104b each form an appropriate angle with respect to a direction of a liquid crystal director when the liquid-crystal polarization rotator element 105 functions as a ¼ wave plate, which will be described further below. The optical axes 104a' and 104b' are parallel to each other (see FIGS. 2 and 3).

As shown in FIG. 3 described above, the p-polarized light beam 31 and the s-polarized light beam 32 emitted from the liquid-crystal polarization rotator element 105 with the rotated polarizing direction again enter the birefringent plate 104b of the modified Savart plate 104. At this time, with the polarizing direction of each of the p-polarized light beam 31 and the s-polarized light beam 32 being rotated by 90 degrees, an incident optical route of each of the p-polarized light beam 31 and the s-polarized light beam 32 to the birefringent plate 104b is a optical path different from an emission optical path from the birefringent plate 104b to the liquid-crystal polarization rotator element 105.

The p-polarized light beam 31 entering the birefringent plate 104b proceeds through the birefringent plate 104b along the optical axis 104b' (see FIG. 27C) as being tilted, and after an azimuth of the polarized light is rotated by 90 degrees at the ½ wave plate 104c, the p-polarized light beam 31 reaches the birefringent plate 104a. Then, after horizontally proceeding through the birefringent plate 104a, the p-polarized light beam 31 is emitted from the birefringent plate 104a to the outside. Here, the p-polarized light beam 31 enters the birefringent plate 104b along the optical path different from that when first entering. Therefore, the optical path along which the light beam sequentially passes the birefringent plate 104b, the ½ wave plate 104c, and then the birefringent plate 104a is different from that when first entering.

On the other hand, the s-polarized light beam 32 entering the birefringent plate 104b horizontally proceeds through the birefringent plate 104b, and after an azimuth of the polarized light is rotated by 90 degrees at the ½ wave plate 104c, the p-polarized light beam 32 reaches the birefringent plate 104a. Then, after proceeding through the birefringent plate 104a along the optical axis 104a' (see FIG. 27C) as being tilted, the s-polarized light beam 32 is emitted from the birefringent plate 104a to the outside. Here, the s-polarized light beam 31 enters the birefringent plate 104b along the optical path different from that when first entering. Therefore, the optical path along which the light beam sequentially passes the birefringent plate 104b, the ½ wave plate 104c, and then the birefringent plate 104a is different from that when first entering.

As described above, when the p-polarized light beam 31 and the s-polarized light beam 32 sequentially pass the birefringent plate 104b, the ½ wave plate 104c, and then the birefringent plate 104a, similarly to the case of first entering, a difference in optical path length between the p-polarized light beam 31 and the s-polarized light beam 32 in the birefringent plate 104b and a difference in optical path length between the p-polarized light beam 31 and the s-polarized light beam 32 in the birefringent plate 104a cancel out each other. Therefore, the optical path along which the light beam sequentially passes through the birefringent plates 104b and 104a is different from that at the time of first entering.

The p-polarized light beam 31 and the s-polarized light beam 32 emitted from the Savart plate 104 pass through the lens 103, as shown in FIG. 1. In this process, the p-polarized light beam 31 and the s-polarized light beam 32 are recombined. Here, the p-polarized light beam 31 and the s-polarized light beam 32 to be combined each have passed along the emission optical path different from the optical path at the time of first entering with the polarizing direction being rotated by the liquid-crystal polarization rotator element 105. Therefore, an optical path of the emitted light L2 obtained through combing both light beams is shifted from a position through which the emitted light L2 can enter the emission-side optical fiber 107.

Therefore, in this case, the emitted light L2 does not enter the emission-side optical fiber 107. Thus, the variable optical attenuator is a normally-off (-close)-type variable optical attenuator in which the emitted light L2 to the outside is 0 when no voltage is applied to the liquid-crystal polarization rotator element 105.

On the other hand, when a high voltage is applied to the liquid crystal layer 105c of the liquid-crystal polarization rotator element 105, as described with reference to either or both of FIGS. 8 and 9 and FIGS. 12 and 13, the polarizing directions of the p-polarized light beam 31 and the s-polarized light beam 32 reflected and emitted from the liquid-crystal polarization rotator element 105 are not rotated, and are identical to those at the time of first entering the liquid-crystal polarization rotator element.

As shown in FIG. 4, the p-polarized light beam 31 and the s-polarized light beam 32 emitted from the liquid-crystal polarization rotator element 105 with their polarizing directions being retained as those at the time of first entering again enter the birefringent plate 104b of the modified Savart plate 104. At this time, the p-polarized light beam 31 and the s-polarized light beam 32 are in the same polarizing directions as those at the time of first entering. Therefore, the incident optical paths of the p-polarized light beam 31 and the s-polarized light beam 32 to the birefringent plate 104*b* are identical to the emission optical paths from the birefringent plate 104*b* to the liquid-crystal polarization rotator element 105.

The p-polarized light beam 31 entering the birefringent plate 104*b* horizontally proceeds through the birefringent plate 104*b* to reach the birefringent plate 104*a*. Then, after the p-polarized light beam 31 proceeds through the birefringent plate 104*a* along the optical axis 104*a*' (see FIG. 27C) as being tilted, the azimuth of the polarized light is rotated by 90 degrees at the ½ wave plate, and then is emitted from the birefringent plate 104*a*. Here, the p-polarized light beam 31 enters the birefringent plate 104*b* along the same optical path as that at the time of first entering as described above. Therefore, the optical path along which the light beam sequentially passes through the birefringent plates 104*b* and 104*a* is identical to that at the time of entering.

On the other hand, the s-polarized light beam 32 entering the birefringent plate 104*b* proceeds through the birefringent plate 104*b* along the optical axis 104'*b* (see FIG. 27C) as being tilted to reach the birefringent plate 104*a*. Then, after horizontally proceeding through the birefringent plate 104*a*, the s-polarized light beam 32 is emitted from the birefringent plate 104*a* to the outside. Here, the s-polarized light beam 32 enters the birefringent plate 104*b* along the same optical path as that at the time of first entering. Therefore, the optical path along which the light beam sequentially passes through the birefringent plates 104*b* and 104*a* is identical to that at the time of first entering.

As described above, when the p-polarized light beam 31 and the s-polarized light beam 32 sequentially pass through the birefringent plate 104*b*, the ½ wave plate 104*c*, and then the birefringent plate 104*a*, similarly to the case of first entering as described above, the difference in optical path length occurring between the p-polarized light beam 31 and the s-polarized light beam 32 in the birefringent plate 104*b* and the difference in optical path length occurring between the p-polarized light beam 31 and the s-polarized light beam 32 in the birefringent plate 104*a* cancel out each other. Therefore, when viewed as the entire modified Savart plate 104, the difference in optical path length between the p-polarized light beam 31 and the s-polarized light beam 32 has been solved.

Other than the above, the present embodiment is similar to the first embodiment, and therefore is provided with the same reference numerals as those in the first embodiment and is not described further. Also, as with the first embodiment, the second to ninth embodiments can be applied to the tenth embodiment.

Furthermore, when an arrayed liquid-crystal polarization rotator element is used for the variable optical attenuator according to any one of the seventh to ninth embodiment of the present invention, if a liquid crystal director is provided so as to be parallel to, be perpendicular to, or be at an angle of 45 degrees to a longitudinal direction of the array sequence, alignment of the liquid crystal director can be selectively performed when retardation in the liquid-crystal polarization rotator element pixels is large.

For example, a polarized-light-rotation ½ wave plate is placed between the modified Savart plate 104, and the liquid-crystal polarization rotator element 105, and the liquid crystal director is aligned so as to be parallel to the longitudinal direction of the array sequence. In this case, it is possible to prevent an operation in which, particularly when a pixel pitch is narrow, the liquid crystal director of the adjacent pixel in a fringing field of the electrode is subjected to twist deformation, thereby extending an effective area of effective pixels.

Still further, depending on the electric field applied to each pixel, it is possible to prevent an operation in which the liquid crystal director of the adjacent pixel in a fringing field of the electrode is subjected to reverse-tilt deformation when the liquid crystal direction is aligned so as to be perpendicular to the array sequence.

Still further, when the liquid crystal director is aligned so as to be at an angle of 45 degrees to the array sequence, modification is possible at each pixel without changing the orientation of the polarized light emitted from the modified Savart plate 104. Therefore, a polarized-light-rotation ½ wave plate can be omitted.

Still further, the structure and operation of the variable optical attenuator and the optical filter using such a variable optical attenuator are not meant to be restricted to the first to tenth embodiments described above, and may be those other than these embodiments.

For example, the optical-path-length-difference correcting unit may be any unit other than a Savart plate. For example, such an optical-path-length-difference correcting unit may be a birefringent plate other than a Savart plate as long as the birefringent plate can correct the difference in optical path length of the polarized light components.

As has been described in the foregoing, according to the embodiments of the present invention, the optical path lengths of two polarized light components separated by the Savart plate can be made identical to each other. As a result, in the variable optical attenuator, PDL and PMD can be reduced, thereby achieving an excellent optical attenuation characteristic.

Also, according to the embodiments of the present invention, birefringent plates and a ½ wave plate are combined to allow correction of a difference in optical path length between the optical paths of the separated polarized light beams in the birefringent plates. Therefore, the optical path lengths of two polarized light components separated by the modified Savart plate can be made identical to each other. As a result, in the variable optical attenuator, PDL and PMD can be reduced, thereby achieving an excellent optical attenuation characteristic.

Furthermore, according to the embodiments of the present invention, a polarized-light-rotation ½ wave plate for rotating a polarized light beam is further placed between the optical-path-length-correction birefringent plate and the liquid-crystal polarization rotator element. Therefore, the azimuth direction of the polarized light beam emitted from the modified Savart plate can be set in an optimal direction with respect to a direction of the liquid crystal director of the liquid-crystal polarization rotator element at the subsequent stage.

Still further, according to the embodiments of the present invention, the liquid-crystal polarization rotator element is a uniaxial variable wave plate. Therefore, attenuation of the amount of emitted light from the liquid-crystal polarization rotator element can be improved. For example, such a uniaxial variable wave plate is formed by using a liquid crystal proven for a liquid crystal display, such as a nematic liquid crystal, a surface-stabilized ferroelectric liquid crystal, or an antiferroelectric liquid crystal.

Still further, according to the embodiments of the present invention, in the liquid-crystal polarization rotator element, the liquid crystal is in homogeneous alignment or vertical alignment, and an electric field is formed in the direction of thickness of the liquid crystal with application of a voltage to the liquid crystal. Alternatively, the liquid crystal is in homogeneous alignment or vertical alignment, and an electric field is formed in the lateral direction of the liquid crystal. Still alternatively, the liquid crystal is in homogeneous alignment or vertical alignment, and an electric field is formed in the direction of thickness and the lateral direction of the liquid crystal. Therefore, for example, with the electric field formed in the direction of thickness, retardation of the liquid crystal can be controlled. Alternatively, with the electric field formed in the lateral direction, the placement direction in the longitudinal direction of the liquid crystal in the lateral direction perpendicular to the direction of thickness can be controlled. Alternatively, with both of these electric fields being simultaneously formed, retardation and the placement direction in the longitudinal direction of the liquid crystal can be controlled. With these controls, rotation of the polarizing direction with the liquid crystal can be controlled.

Still further, according to the embodiments of the present invention, one of paired electrodes of the liquid-crystal polarization rotator element is formed on a Si substrate, and a driving circuit that controls the voltage is placed on that Si substrate. Therefore, it is possible to achieve a highly-functional, low-power-consumption structure with a driving circuit and a control circuit being integrated thereon.

Still further, according to the embodiments of the present invention, voltage control is performed through a pulse width modulation scheme. Therefore, the driving circuit is downsized, and the control is easily performed. Also, a multi-tone driving circuit can be formed exclusively with digital circuits.

Still further, according to the embodiments of the present invention, a pair of electrodes includes a transparent electrode formed of a transparent conductive film and a reflecting electrode formed of a reflective conductive film, and the transparent electrode is formed of an ITiO film. Therefore, the same conductivity as that of the transparent electrode can be achieved from ITO. Also, plasma reflection can be suppressed more than the case in which the transparent film is formed of ITO. Therefore, the optical attenuation characteristic is further improved.

Still further, according to the embodiments of the present invention, the light input and output unit is formed of optical fibers, and an optical fiber for light input and an optical fiber for light output are separately provided. Therefore, light input and light output are separately performed through separate optical fibers. Thus, no optical circulator is required, thereby reducing the number of components.

Still further, according to the embodiments of the present invention, the light input and output unit is formed of an optical fiber, and light input and light output is performed through the common optical fiber. Therefore, the number of placement of optical fibers can be reduced, thereby simplifying the structure.

Still further, according to the embodiments of the present invention, a fiber collimator is placed at an end of the optical fiber. Therefore, with the fiber collimator, optical coupling efficiency to the optical fiber can be improved.

Still further, according to the embodiments of the present invention, a light-gathering optical lens is placed between the optical fiber and the optical-path-length-difference correction plate. Also, the beam diameter of light entering and emitted from the fiber collimator is set to be equal to or smaller than 50 μm. Furthermore, light input and output is directly performed between the fiber collimator and the optical-path-length-difference correction plate. Therefore, even when a light-gathering optical lens is not placed between the optical fiber and the optical-path-length-difference correction plate, light gathering can be made similarly to the case in which such an optical lens is placed.

Still further, according to the embodiments of the present invention, the liquid-crystal polarization rotator element has a structure in which a plurality of liquid-crystal polarization rotator element pixels are arrayed, and the voltage can be applied to each liquid crystal of each liquid-crystal polarization rotator element pixel separately for each pixel. Therefore, a multichannel variable optical attenuator can be achieved.

Still further, according to the embodiments of the present invention, in the liquid-crystal polarization rotator element, the liquid crystal director is aligned so as to be parallel to or perpendicular to the longitudinal direction of the array sequence when retardation in the liquid-crystal polarization rotator element pixels is large. Thus, in combination of the modified Savart plate and the polarized-light-rotation ½ wave plate, the liquid crystal director is aligned so as to be parallel to the array. In this case, it is possible to prevent an operation in which, when a pixel pitch is narrow, the liquid crystal director of the adjacent pixel in a fringing field of the electrode is subjected to twist deformation, thereby extending an effective area of arrayed effective pixels.

Still further, according to the embodiments of the present invention, in the liquid-crystal polarization rotator element, the liquid-crystal polarization rotator element pixels and the driving circuit for the liquid-crystal polarization rotator element pixels are placed on the same Si substrate. Therefore, it is possible to achieve a liquid-crystal polarization rotator element having a circuit, such as a driving circuit, and a plurality of liquid-crystal polarization rotator element pixels integrated thereon. Thus, a small-sized multichannel optical attenuator with reduced power consumption can be achieved.

Still further, according to the embodiments of the present invention, drivers that drive the driving circuit are further provided. The drivers are provided on an upper portion and a lower portion of a placement area of the liquid-crystal polarization rotator element pixels. The adjacent driving circuits of the liquid-crystal polarization rotator element pixels are alternately connected to the driver on the upper portion and the driver on the lower portion. Also, the area for placing the liquid-crystal polarization rotator element pixels and the drivers are separated from each other. Therefore, the area for placing the liquid-crystal polarization rotator element pixels does not have to be planarized, thereby simplifying a manufacturing process. Also, the liquid-crystal polarization rotator element pixels are alternately connected to the upper driver and the lower driver, thereby widening a pitch of the driver circuits.

Still further, according to the embodiments of the present invention, the light input and output unit is formed of optical fibers, and the number of placement of optical fibers for light input is equal to or smaller than the number of placement of liquid-crystal polarization rotator element pixels of the liquid-crystal polarization rotator element. When the number of placement of optical fibers for light input is equal to the number of placement of liquid-crystal polarization rotator element pixels of the liquid-crystal polarization rotator element, one channel in an optical attenuation operation of the variable optical attenuator is achieved by one liquid-crystal polarization rotator element pixel. On the other hand, when the number of placement of optical fibers for light input is smaller than the number of placement of liquid-crystal polarization rotator element pixels of the liquid-crystal polarization rotator element, one channel in an optical attenuation operation of the variable optical attenuator is achieved by a plurality of liquid-crystal polarization rotator element pixels.

Still further, according to the embodiments of the present invention, the optical filter includes the variable optical attenuator described above. Therefore, since the effect can be attained in the variable optical attenuator, an excellent filter characteristic can be achieved.

According to the present invention, a small-sized variable optical attenuator having an excellent optical attenuation characteristic can be achieved. Moreover, a small-sized optical filter with an excellent filter characteristic can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2004-122646 filed in Japan on Apr. 19, 2004, 2004-211002 filed in Japan on Jul. 20, 2004 and 2005-070169 filed in Japan on Mar. 11, 2005.

What is claimed is:

1. A variable optical attenuator comprising:
an input and output unit that inputs light from outside and that outputs light to outside;
a polarization rotator element that includes a liquid crystal, sandwiched between a pair of electrodes, and rotates a polarizing direction of a light traveling therethrough by controlling a voltage applied to the liquid crystal through the electrodes; and
an optical-path-length correction plate that is arranged between the input and output unit and the polarization rotator element, and that separates the light input from the input and output unit into p-polarized light and s-polarized light to be output to the polarization rotator element, and combines the p-polarized light and the s-polarized light reflected from the polarization rotator element into light to be output to the input and output unit, wherein
the p-polarized light and the s-polarized light travel through the optical-path-length correction plate along different optical paths of substantially equal length, and
an amount of light output from the input and output unit is determined by a birefringence characteristic of the liquid crystal that is determined by the voltage applied to the liquid crystal through the electrodes.

2. The variable optical attenuator according to claim 1, wherein
the optical-path-length correction plate is a Savart plate including a pair of birefringent plates.

3. The variable optical attenuator according to claim 1, wherein
the optical-path-length correction plate includes a pair of birefringent plates and a ½ wave plate.

4. The variable optical attenuator according to claim 3, wherein
the ½ wave plate is sandwiched between the birefringent plates.

5. The variable optical attenuator according to claim 3, further comprising a polarized-light rotation plate that is arranged between the optical-path-length correction plate and the polarization rotator element, wherein the polarized-light rotation plate is a ½ wave plate that rotates the polarizing direction.

6. The variable optical attenuator according to claim 1, wherein the polarization rotator element functions as a uniaxial variable wave plate.

7. The variable optical attenuator according to claim 6, further comprising a residual-birefringence correction plate that is arranged on a surface of the polarization rotator element orthogonal to a liquid crystal molecule in the liquid crystal.

8. The variable optical attenuator according to claim 6, wherein
when a first voltage is applied, the uniaxial variable wave plate functions as a ¼ wave plate that rotates the polarizing direction of a light traveling through the liquid crystal by 90 degrees,
when a second voltage that is higher than the first voltage is applied, the uniaxial variable wave plate does not function as a wave plate, and
the voltage applied to the liquid crystal through the electrodes is varied between the first voltage and the second voltage.

9. The variable optical attenuator according to claim 6, wherein
when a first voltage is applied, the uniaxial variable wave plate does not function as a wave plate,
when a second voltage that is higher than the first voltage is applied, the uniaxial variable wave plate functions as a ¼ wave plate that rotates the polarizing direction of light traveling through the liquid crystal by 90 degrees, and
the voltage applied to the liquid crystal through the electrodes is varied between the first voltage and the second voltage.

10. The variable optical attenuator according to claim 9, further comprising a switching-mode reversing wave plate that is arranged between the input and output unit and the polarization rotator element to cancel a retardation by the polarization rotator element.

11. The variable optical attenuator according to claim 1, wherein
the liquid crystal is any one of a homogeneously-aligned liquid crystal and a vertically-aligned liquid crystal, and
with the voltage being applied to the liquid crystal, an electric field is formed in a direction of thickness of the liquid crystal.

12. The variable optical attenuator according to claim 1, wherein
the liquid crystal is any one of a homogeneously-aligned liquid crystal and a vertially-aligned liquid crystal, and
with the voltage being applied to the liquid crystal, an electric field is formed in a direction of width of the liquid crystal.

13. The variable optical attenuator according to claim 1, wherein
the liquid crystal is any one of a homogeneously-aligned liquid crystal and a vertically-aligned liquid crystal, and
with the voltage being applied to the liquid crystal, an electric field is formed in a direction of thickness and a direction of width of the liquid crystal.

14. The variable optical attenuator according to claim 1, further comprising a driving circuit that controls the voltage, wherein
one of the electrodes is formed on an Si substrate, and
the driving circuit is arranged on the Si substrate.

15. The variable optical attenuator according to claim 14, wherein
the driving circuit is a complementary metal oxide semiconductor integrated circuit.

16. The variable optical attenuator according to claim 14, wherein
the voltage is controlled by a pulse width modulation scheme.

17. The variable optical attenuator according to claim 1, wherein
the electrodes include a transparent electrode formed with a transparent conductive film and a reflecting electrode formed with a reflective conductive film, and
the transparent electrode is formed with an ITiO film.

18. The variable optical attenuator according to claim 1, wherein
the input and output unit is formed with optical fibers, and
the optical fibers include an optical fiber for light input and an optical fiber for light output that are separately provided.

19. The variable optical attenuator according to claim 1, wherein
the input and output unit is formed with an optical fiber, and input and output of light is performed with a common optical fiber.

20. The variable optical attenuator according to claim 19, wherein
an optical circulator that separates light incident to and emitted from the optical fiber is connected to the optical fiber.

21. The variable optical attenuator according to claim 18, wherein
a fiber collimator is arranged at an end of the optical fiber.

22. The variable optical attenuator according to claim 19, wherein
a fiber collimator is arranged at an end of the optical fiber.

23. The variable optical attenuator according to claim 21, wherein
a light-gathering optical lens is arranged between the optical fiber and the optical-path-length correction plate.

24. The variable optical attenuator according to claim 22, wherein
a light-gathering optical lens is arranged between the optical fiber and the optical-path-length correction plate.

25. The variable optical attenuator according to claim 21, wherein
a beam diameter of a light incident to and emitted from the fiber collimator is 50 micrometers or less, and
input and output of a light is directly performed between the fiber collimator and the optical-path-length correction plate.

26. The variable optical attenuator according to claim 22, wherein
a beam diameter of a light incident to and emitted from the fiber collimator is 50 micrometers or less, and
input and output of a light is directly performed between the fiber collimator and the optical-path-length correction plate.

27. The variable optical attenuator according to claim 1, wherein
the polarization rotator element has a structure in which a plurality of polarization rotator element pixels are arrayed, and in which the voltage can be applied to each liquid crystal of each polarization rotator element pixel independently for each of the polarization rotator element pixels.

28. The variable optical attenuator according to claim 27, wherein
in the polarization rotator element, a liquid crystal director is aligned parallel to or perpendicular to a direction of length of an arrayed structure of the polarization rotator element when retardation in the polarization rotator element pixels is large.

29. The variable optical attenuator according to claim 27, wherein
the polarization rotator element includes a driving circuit for the polarization rotator element pixels, and
in the polarization rotator element, the polarization rotator element pixels and the driving circuit are arranged on an identical Si substrate.

30. The variable optical attenuator according to claim 29, further comprising drivers that drive the driving circuit, wherein
the drivers are provided on an upper portion and a lower portion of a placement area in the polarization rotator element pixels, and
the driving circuit of the polarization rotator element pixels is alternately connected to the driver on the upper portion and the driver on the lower portion.

31. The variable optical attenuator according to claim 27, wherein
the input and output unit is formed with optical fibers, and
number of optical fibers for light input is equal to or smaller than number of the polarization rotator element pixels.

32. An optical filter comprising a variable optical attenuator that includes:
an input and output unit that inputs light from outside and that-outputs light to outside;
a polarization rotator element that includes a liquid crystal sandwiched between a pair of electrodes, and rotates a polarizing direction of light traveling therethrough by controlling a voltage applied to the liquid crystal through the electrodes; and
an optical-path-length correction plate that is arranged between the input and output unit and the polarization rotator element, and that separates a light input from the input and output unit into p-polarized light and s-polarized light to be output to the polarization rotator element, and combines the p-polarized light and the s-polarized light reflected from the polarization rotator element into light to be output to the input and output unit, wherein
the p-polarized light and the s-polarized light travel through the optical-path-length correction plate along different optical paths of substantially equal length, and
an amount of light output from the input and output unit is determined by a birefringence characteristic of the liquid crystal that is determined by the voltage applied to the liquid crystal through the electrodes.

33. The optical filter according to claim 32, further comprising a spectroscope unit that separates the light input from the input and output unit into a plurality of wavelengths, each of which enters, via the optical-path-length correction plate, a predetermined one of the polarization rotator element pixels of the olarization rotator element.

* * * * *